United States Patent
Inada et al.

(10) Patent No.: US 9,430,261 B2
(45) Date of Patent: Aug. 30, 2016

(54) CONTROLLING APPARATUS, AND CONTROLLING METHOD

(71) Applicant: FUJITSU LIMITED, Kawasaki-shi, Kanagawa (JP)

(72) Inventors: Hiroyuki Inada, Yokohama (JP); Naohiro Tamura, Yokohama (JP); Masahiro Chiba, Yokohama (JP); Masayoshi Utaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/534,922

(22) Filed: Nov. 6, 2014

(65) Prior Publication Data

US 2015/0154040 A1    Jun. 4, 2015

(30) Foreign Application Priority Data

Dec. 3, 2013   (JP) ................. 2013-250600

(51) Int. Cl.
*G06F 9/44*     (2006.01)
*G06F 9/455*    (2006.01)
*G06F 11/14*    (2006.01)
(Continued)

(52) U.S. Cl.
CPC ............ *G06F 9/45533* (2013.01); *G06F 9/50* (2013.01); *G06F 11/1456* (2013.01); *G06F 11/1464* (2013.01); *G06F 11/3433* (2013.01); *G06F 11/3466* (2013.01); *G06F 11/3688* (2013.01);
(Continued)

(58) Field of Classification Search
CPC ..................... G06F 11/3466; G06F 2201/865; G06F 11/3636; G06F 11/3688
See application file for complete search history.

(56) References Cited

U.S. PATENT DOCUMENTS 8,495,178 B1 *  7/2013  Jia ..................... G06F 11/1464
                                                    370/235
8,498,966 B1    7/2013  Waghole
(Continued)

FOREIGN PATENT DOCUMENTS

GB         2495677 A       4/2013
JP      2008-123205        5/2008
(Continued)

OTHER PUBLICATIONS

Voorsluys et al., "Cost of Virtual Machine Live Migration in Clouds—A Performance Evaluation", Springer, Dec. 2009, pp. 254-265; <http://link.springer.com/chapter/10.1007%2F978-3-642-10665-1_23#page-1>.*

(Continued)

*Primary Examiner* — Thuy Dao
*Assistant Examiner* — Ben C Wang
(74) *Attorney, Agent, or Firm* — Staas & Halsey LLP

(57) ABSTRACT

A controlling method realized by a computer connected to a plurality of physical devices in which respective virtual machines (VMs) are operated and a process device which is connected to the plurality of physical devices with a plurality of routes and in which a plurality of duplication process VMs for executing a duplication process of duplicating data used by the plurality of VMs to a memory device, the method includes: acquiring loads of the plurality of routes and percentages of completion of the duplication process executed by the plurality of duplication process VMs; and, when incompletion of the duplication process using the selected route within a regulated time is detected, moving any of the duplication process VMs using the selected route to any of the plurality of physical devices from the process device.

12 Claims, 12 Drawing Sheets

(51) Int. Cl.
  *G06F 9/50* (2006.01)
  *G06F 11/34* (2006.01)
  *G06F 11/36* (2006.01)
(52) U.S. Cl.
  CPC ... *G06F 2201/815* (2013.01); *G06F 2201/865* (2013.01)

(56) References Cited

U.S. PATENT DOCUMENTS

| | | | | |
|---|---|---|---|---|
| 8,615,589 | B1* | 12/2013 | Adogla | G06F 9/5077 709/226 |
| 8,959,509 | B1* | 2/2015 | Sobel | G06F 9/4843 718/1 |
| 2008/0115143 | A1 | 5/2008 | Shimizu et al. | |
| 2009/0119493 | A1* | 5/2009 | Venkitachalam | G06F 11/3636 712/238 |
| 2009/0172666 | A1 | 7/2009 | Yahalom et al. | |
| 2009/0307597 | A1* | 12/2009 | Bakman | G06F 11/008 715/736 |
| 2010/0268816 | A1 | 10/2010 | Tarui et al. | |
| 2011/0055385 | A1* | 3/2011 | Tung | G06F 9/5072 709/224 |
| 2012/0079480 | A1* | 3/2012 | Liu | G06F 11/3409 718/1 |
| 2012/0159454 | A1* | 6/2012 | Barham | G06F 9/45558 717/128 |
| 2013/0332778 | A1* | 12/2013 | Spracklen | G06F 11/3409 714/47.1 |
| 2014/0047436 | A1* | 2/2014 | Jayachandran | G06F 8/71 718/1 |
| 2014/0059207 | A1* | 2/2014 | Gulati et al. | 709/224 |
| 2014/0075412 | A1* | 3/2014 | Kannan | H04L 41/5016 717/120 |
| 2014/0282503 | A1* | 9/2014 | Gmach | H04L 41/0823 718/1 |
| 2014/0372596 | A1* | 12/2014 | Bala | G06F 11/3003 709/224 |
| 2015/0052523 | A1* | 2/2015 | Raghu | 718/1 |
| 2015/0127858 | A1* | 5/2015 | Sarkar et al. | 710/18 |
| 2015/0234713 | A1* | 8/2015 | Shimada | 718/1 |
| 2015/0301861 | A1* | 10/2015 | LaChiusa | G06F 11/3072 718/102 |

FOREIGN PATENT DOCUMENTS

| | | |
|---|---|---|
| JP | 2012-83870 | 4/2012 |
| WO | WO 2012/046354 A1 | 4/2012 |

OTHER PUBLICATIONS

Babu et al., "Optimal Allocation of Virtual Resources using Genetic Algorithm in Cloud Environments", ACM, May 2015, pp. 1-6; <http://dl.acm.org/citation.cfm?id=2744722&CFID=629318536&CFTOKEN=18281157>.*

Zhang et al., "Delay Guaranteed Live Migration of Virtual Machines", IEEE, Apr. 2014, pp. 574-582; <http://ieeexplore.ieee.org/stamp/stamp.jsp?tp=&arnumber=6847982>.*

Extended European Search Report issued May 26, 2015 in corresponding European Patent Application No. 14192434.0.

* cited by examiner

FIG. 3

| PHYSICAL SERVER NAME | CPU POWER | MEMORY CAPACITY | NETWORK BAND (SAN) |
|---|---|---|---|
| BACK-UP SERVER | 4 GHz×32 | 128 GB | ROUTE 1 : 8 Gbps<br>ROUTE 2 : 8 Gbps |
| MANAGEMENT TARGET SERVER A | 4 GHz×12 | 32 GB | ROUTE 3 : 8 Gbps |
| MANAGEMENT TARGET SERVER B | 4 GHz×24 | 64 GB | ROUTE 4 : 8 Gbps |
| MANAGEMENT TARGET SERVER C | 4 GHz×8 | 16 GB | ROUTE 5 : 4 Gbps |

FIG. 4

| BACK-UP PROGRAM | NETWORK ROUTE (SAN) |
|---|---|
| A | ROUTE 1 |
| B | ROUTE 2 |
| C | ROUTE 1 |
| D | ROUTE 2 |

| BACK-UP PROGRAM | CPU LOAD (%) | MEMORY LOAD (%) | LOAD OF SAN (%) |
|---|---|---|---|
| A | 10 | 20 | 10 |
| B | 20 | 20 | 5 |
| C | 30 | 30 | 30 |
| D | 10 | 20 | 95 |

FIG. 6

| DAY | BACK-UP TIME |
|---|---|
| MONDAY | 0:00-5:00 |
| TUESDAY | 2:00-5:00 |
| WEDNESDAY | 2:00-5:00, 22:00-24:00 |
| THURSDAY | 0:00-5:00 |
| FRIDAY | 2:00-5:00 |
| SATURDAY | 4:00-7:00, 21:00-24:00 |
| SUNDAY | 0:00-7:00, 21:00-24:00 |

| VIRTUAL MACHINE NAME OF BACK-UP TARGET | SIZE OF DATA IN SYSTEM AREA |
|---|---|
| OPERATION A | 20 GB |
| OPERATION B | 30 GB |
| OPERATION C | 10 GB |
| OPERATION D | 50 GB |

CONTROLLING APPARATUS, AND CONTROLLING METHOD

CROSS-REFERENCE TO RELATED APPLICATION

This application is based upon and claims the benefit of priority from the prior Japanese Patent Application No. 2013-250600 filed on Dec. 3, 2013, the entire contents of which are incorporated herein by reference.

FIELD

The embodiments discussed herein are related to a controlling program, a controlling apparatus, and a controlling method.

BACKGROUND

In the related art, in a system including a virtual machine generated on a physical device, there is provided a technology of executing a duplication (back-up) process of a storage area used by the virtual machine. For example, a back-up device which is a physical device is provided in such a system, and there is provided a technology of executing the duplication process by the back-up device.

Japanese Laid-open Patent Publication No. 2008-123205 is an example of the related art.

Herein, in order to reduce delay of the duplication process due to an increase in load of the process of the back-up device, the following process is executed in the system described above. For example, in the back-up device, a duplication process virtual machine which is a virtual machine for executing the duplication process is operated for each duplication process, and when the duplication process is delayed, the duplication process virtual device which is a factor of the delay is moved to a physical device other than the back-up device.

As an index for specifying the factor of the delay of the duplication process, a load of a route which connects devices to each other is provided, in addition to loads of a central processing unit (CPU) and a memory of the duplication process virtual machine operated on the back-up device. For example, the duplication process virtual machine including a CPU and a memory having loads equal to or greater than a threshold value is considered as a factor of the delay of the duplication process.

Herein, a route for connecting the back-up device and a memory device at a duplication destination of the duplication process may be redundant. In this case, any of the plurality of redundant routes may be used in the plurality of duplication process virtual machines operated in the back-up device. Accordingly, when the route is redundant, although the route having a load equal to or greater than a threshold value may be specified as a factor of the delay of the duplication process, it is difficult to specify the duplication process virtual machine using the specified route. Therefore, when the route is redundant, it is difficult to specify the duplication process virtual machine moved to the physical device other than the back-up device, by only specifying the route which is the factor of the delay. Thus, when the route is redundant, in a case where the route is the factor of the delay of the duplication process, it may be difficult to complete the duplication process within a regulated time.

According to an embodiment, an object of the disclosure is to suppress the delay of the duplication process, when the route is the factor of the delay of the duplication process.

SUMMARY

According to an aspect of the invention, a controlling method realized by a computer connected to a plurality of physical devices in which respective virtual machines (VMs) are operated and a process device which is connected to the plurality of physical devices with a plurality of routes and in which a plurality of duplication process VMs for executing a duplication process of duplicating data used by the plurality of VMs to a memory device, the method includes: acquiring loads of the plurality of routes and percentages of completion of the duplication process executed by the plurality of duplication process VMs; and, when incompletion of the duplication process using the selected route within a regulated time is detected, moving any of the duplication process VMs using the selected route to any of the plurality of physical devices from the process device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a data structure of an allowable load quantity table;

FIG. 4 is a diagram illustrating an example of a data structure of a correspondence relation table;

FIG. 5 is a diagram illustrating an example of a data structure of load information;

FIG. 6 is a diagram illustrating an example of a data structure of back-up information;

FIG. 7 is a diagram illustrating an example of a data structure of size information;

DESCRIPTION OF EMBODIMENTS

Hereinafter, examples of a management server as an example of a control device disclosed in this specification, a controlling program, and a controlling method are described in detail with reference to the drawings. The examples do not limit the technology disclosed herein.

EXAMPLES

Example of Configuration of System 1

Figure 1:
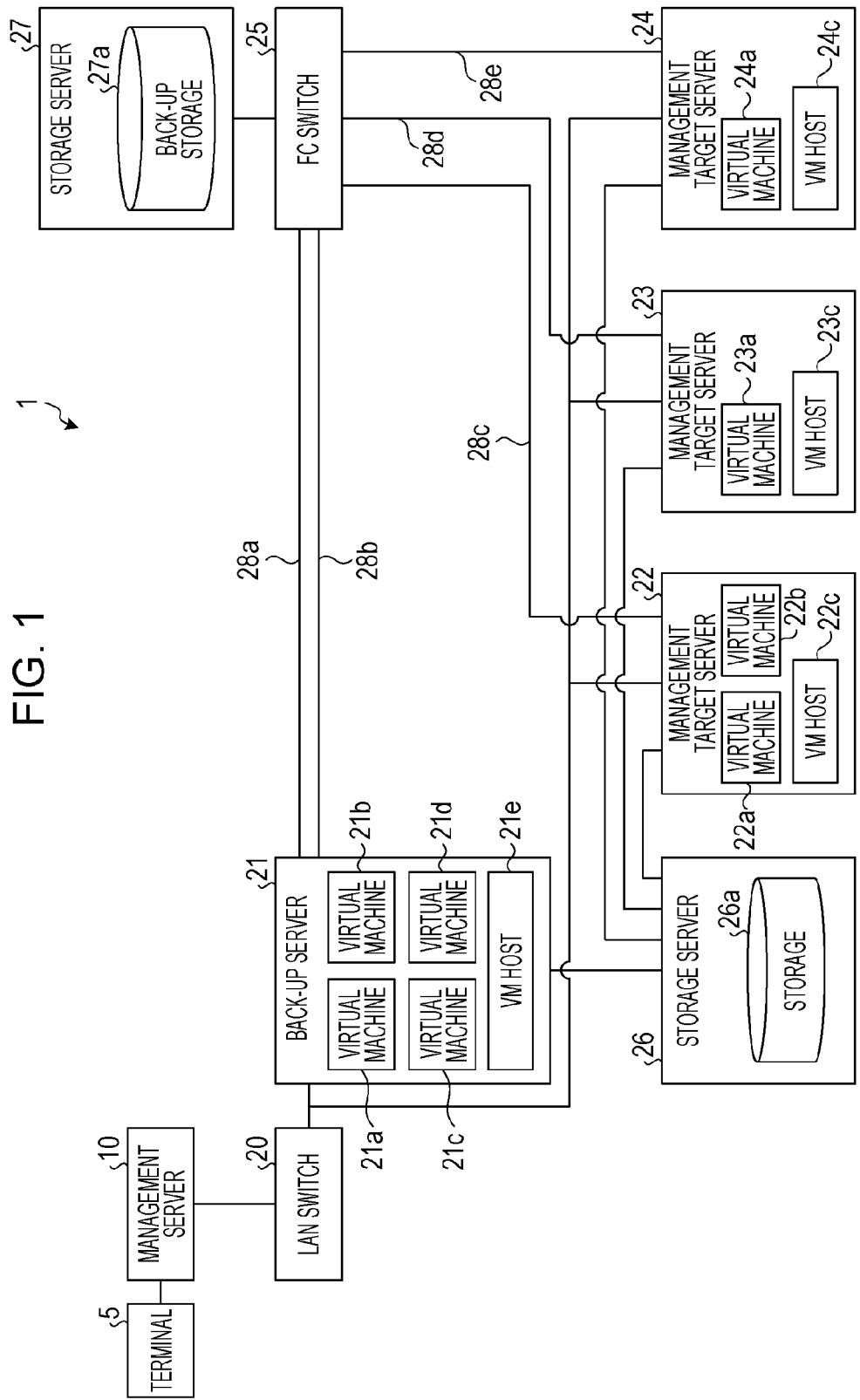
FIG. 1 is a diagram illustrating an example of a configuration of a system including a management server according to an example.

FIG. 1 is a diagram illustrating an example of a configuration of a system 1 including a management server 10 according to an example. As illustrated in the example of FIG. 1, the system 1 includes a terminal 5, the management server 10, a local area network (LAN) switch 20, a back-up server 21, management target servers 22, 23, and 24, and a fiber channel (FC) switch 25. The system 1 further includes storage servers 26 and 27.

The terminal 5 is a terminal used by a user such as an operator of the system 1. The terminal 5, for example, includes a receiving unit (not illustrated) such as a keyboard or a mouse which receives an instruction from a user, and transmits the received instruction to the management server 10. As an example of such an instruction, an instruction of performing various settings of a virtual machine is provided.

The management server 10 manages various devices of the system 1. The management server 10, for example, transmits the instruction of performing various settings of the virtual machine to the management target servers 22 to 24 through the LAN switch 20. In addition, the management server 10 performs the following process, so that a back-up process, which will be described later, performed by virtual machines 21a to 21d operated on the back-up server 21 is completed within a regulated time. That is, the management server 10 controls so that the virtual machines 21a to 21d in which the back-up process is expected not to be completed within the regulated time, are moved to any one management target server among three management target servers 22 to 24. The management server 10, for example, transmits a migration instruction for moving the virtual machine in which the back-up process is expected not to be completed within the regulated time, to the management target server, to a VM host 21e which performs a control of operating the virtual machines 21a to 21d.

The back-up server 21 is connected to the management server 10 through the LAN switch 20. The back-up server 21 is connected to the storage server 26. The back-up server 21 is connected to the FC switch 25 through two lines 28a and 28b. Herein, the FC switch 25 is connected to the storage server 27 which is a memory device at a back-up destination of the data obtained by the back-up process. As described above, in the system 1, there are two routes for connecting the back-up server 21 and the storage server 27 which is a back-up destination of the data obtained by the back-up process. That is, in the system 1, the routes for connecting the back-up server 21 and the storage server 27 are redundant. Any of the plurality of redundant lines 28a and 28b may be used in the plurality of virtual machines 21a to 21d.

The back-up server 21 includes the virtual machine (VM) host 21e. The VM host 21e is a controlling program of virtualization software which virtually realizes an operation environment of a computer system, and performs a control of operating the virtual machines 21a to 21d. In addition, the VM host 21e performs a control of migration of the virtual machines 21a to 21d among the management target servers 22 to 24, according to the migration instruction received from the management server 10.

Each of the virtual machines 21a to 21d executes a back-up program for performing the back-up process of backing up of data in a system area of each virtual machine operated on the management target servers 22 to 24. The virtual machine 21a, for example, executes a back-up program A for performing a back-up process of backing up of data in a system area of the virtual machine 22a operated on the management target server 22. The virtual machine 21b executes a back-up program B for performing a back-up process of backing up of data in a system area of the virtual machine 22b operated on the management target server 22. The virtual machine 21c executes a back-up program C for performing a back-up process of backing up of data in a system area of the virtual machine 23a operated on the management target server 23. The virtual machine 21d executes a back-up program D for performing a back-up process of backing up of data in a system area of the virtual machine 24a operated on the management target server 24. Although it will be described later, the back-up process is a process of duplicating data in a system area by storing data in a system area stored in a storage 26a to a back-up storage 27a which will be described later, and therefore the back-up process is also referred to as a duplication process. In addition, the virtual machines 21a to 21d which execute the back-up process are an example of the duplication process virtual machine.

The management target servers 22 to 24 are devices which are management targets of the management server 10. In the management target servers 22 to 24, the virtual machine which executes a predetermined application is operated, and setting of the virtual machine is performed according to an instruction of performing various settings of the virtual machine transmitted from the management server 10.

The management target server 22 includes a VM host 22c. The VM host 22c is a controlling program of virtualization software which virtually realizes an operation environment of a computer system, and performs a control of operating two virtual machines 22a and 22b. In addition, when the VM host 22c receives an instruction of performing various settings of the virtual machines 22a and 22b transmitted from the management server 10, the VM host 22c performs various setting of the virtual machines 22a and 22b according to the received instructions. The virtual machine 22a executes a predetermined application. In addition, the virtual machine 22a transmits data in a system area of the virtual machine 22a to the storage server 26. Accordingly, as will be described later, the data in the system area of the virtual machine 22a is stored in the storage 26a of the storage server 26. The virtual machine 22b executes a predetermined application. The virtual machine 22b transmits the data in the system area in the virtual machine 22b to the storage server 26. Accordingly, as will be described later, the data in the system area of the virtual machine 22b is stored in the storage 26a.

The management target server 23 includes a VM host 23c. The VM host 23c is a controlling program of virtualization software which virtually realizes an operation environment of a computer system, and performs a control of operating the virtual machine 23a. In addition, when the VM host 23c receives an instruction of performing various settings of the virtual machine 23a transmitted from the management server 10, the VM host performs various setting of the virtual machine 23a according to the received instructions. The virtual machine 23a executes a predetermined application. In addition, the virtual machine 23a transmits data in a system area of the virtual machine 23a to the storage server 26. Accordingly, as will be described later, the data in the system area of the virtual machine 23a is stored in the storage 26a.

The management target server 24 includes a VM host 24c. The VM host 24c is a controlling program of virtualization software which virtually realizes an operation environment of a computer system, and performs a control of operating the virtual machine 24a. In addition, when the VM host 24c receives an instruction of performing various settings of the virtual machine 24a transmitted from the management server 10, the VM host performs various setting of the virtual machine 24a according to the received instructions. The virtual machine 24a executes a predetermined application. In addition, the virtual machine 24a transmits data in a system area of the virtual machine 24a to the storage server 26. Accordingly, as will be described later, the data in the system area of the virtual machine 24a is stored in the storage 26a.

The FC switch 25 is a relay device which relays data. The FC switch 25 is connected to the back-up server 21 through the lines 28a and 28b by Fibre Channel fabric. The FC switch 25 is connected to the management target server 22 through a line 28c, connected to the management target server 23 through a line 28d, and connected to the management target server 24 through a line 28e, by Fibre Channel fabric. In addition, the FC switch 25 is connected to the storage server 27 by Fibre Channel fabric. As described above, a storage area network (SAN) is constructed in the system 1.

The storage server 26 includes the storage 26a such as a hard disk drive (HDD), and when the storage server receives the data in the system area transmitted from the virtual machines 22a, 22b, 23a, and 24a, the received data in the system area is stored in the storage 26a. Accordingly, the data in the system area of the virtual machines 22a, 22b, 23a, and 24a is stored in the storage 26a.

The storage server 27 is a memory device at a back-up destination of the data in the system area of the virtual machines 22a, 22b, 23a, and 24a. The storage server 27 includes the back-up storage 27a such as an HDD. When the storage server 27 receives the data in the system area of the virtual machine 22a transmitted from the virtual machine 21a which executes the back-up program A, through the FC switch 25, the received data is stored in the back-up storage 27a. When the storage server 27 receives the data in the system area of the virtual machine 22b transmitted from the virtual machine 21b which executes the back-up program B, through the FC switch 25, the received data is stored in the back-up storage 27a. When the storage server 27 receives the data in the system area of the virtual machine 23a transmitted from the virtual machine 21c which executes the back-up program C, through the FC switch 25, the received data is stored in the back-up storage 27a. When the storage server 27 receives the data in the system area of the virtual machine 24a transmitted from the virtual machine 21d which executes the back-up program D, through the FC switch 25, the received data is stored in the back-up storage 27a.

Figure 2:
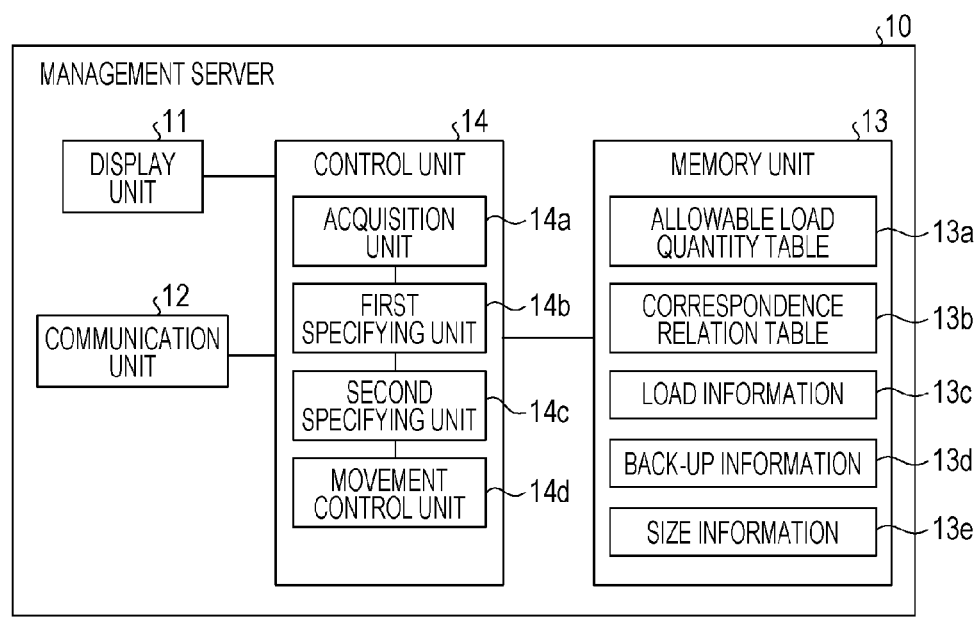
FIG. 2 is a diagram illustrating an example of a functional configuration of a management server which is an example of a controlling apparatus according to the example.

FIG. 2 is a diagram illustrating an example of a functional configuration of the management server 10 which is an example of a controlling apparatus according to the example. As illustrated in FIG. 2, the management server 10 includes a display unit 11, a communication unit 12, a memory unit 13, and a control unit 14.

The display unit 11 displays various information items. As an example of a device of the display unit 11, a liquid crystal display or the like is used.

When the communication unit 12 receives data such as various instructions transmitted from a device other than the management server 10, the communication unit transmits the received data to the control unit 14. When the communication unit 12 receives various data items from the control unit 14, the communication unit transmits the received data to the designated device. When the control unit 14, for example, receives an instruction of a user transmitted from the terminal 5, the control unit transmits the received instruction to the control unit 14. In addition, when the communication unit 12 receives various instructions to the VM hosts 22c, 22d, and 22e transmitted from the control unit 14, the communication unit transmits the received instructions to the designated VM host. As a device of the communication unit 12, a network card is used.

The memory unit 13 stores various information items. The memory unit 13, for example, stores an allowable load quantity table 13a, a correspondence relation table 13b, load information 13c, back-up information 13d, and size information 13e.

The allowable load quantity table 13a is a table in which maximum allowable quantities of loads of various resources of each server of the back-up server 21 and the management target servers 22 to 24 are registered. FIG. 3 is a diagram illustrating an example of a data structure of the allowable load quantity table. The allowable load quantity table 13a illustrated in the example of FIG. 3 includes entries of "physical server name", "CPU power", "memory capacity", and "network band (SAN)".

A name of each server for identifying each server of the back-up server 21 which is a physical server and the management target servers 22 to 24 is registered in the entry of the "physical server name". As illustrated in FIG. 3, a back-up server which is the name of the back-up server 21 is registered in the entry of the "physical server name" in a first record of the allowable load quantity table 13a. As illustrated in FIG. 3, a management target server A which is the name of the management target server 22 is registered in the entry of the "physical server name" in a second record of the allowable load quantity table 13a. As illustrated in FIG. 3, a management target server B which is the name of the management target server 23 is registered in the entry of the "physical server name" in a third record of the allowable load quantity table 13a. As illustrated in FIG. 3, a management target server C which is the name of the management target server 24 is registered in the entry of the "physical server name" in a fourth record of the allowable load quantity table 13a.

An operation frequency and the number of cores indicating process performance of the CPU included by each server of the back-up server 21 and the management target servers 22 to 24 are registered in the entry of the "CPU power". As illustrated in FIG. 3, the operation frequency, 4 GHz, and the number of cores, 32, of the CPU of the back-up server 21, the name of which is the back-up server, are registered in the entry of the "CPU power" in the first record of the allowable load quantity table 13a. As illustrated in FIG. 3, the operation frequency, 4 GHz, and the number of cores, 12, of the CPU of the management target server 22, the name of which is the management target server A, are registered in the entry of the "CPU power" in the second record of the allowable load quantity table 13a. As illustrated in FIG. 3, the operation frequency, 4 GHz, and the number of cores, 24, of the CPU of the management target server 23, the name of which is the management target server B, are registered in the entry of the "CPU power" in the third record of the allowable load quantity table 13a. As illustrated in FIG. 3, the operation frequency, 4 GHz, and the number of cores, 8, of the CPU of the management target server 24, the name of which is the management target server C, are registered in the entry of the "CPU power" in the fourth record of the allowable load quantity table 13a.

The capacity items representing the performance of the memory included by each server of the back-up server 21 and the management target servers 22 to 24 are registered in the entry of the "memory capacity". As illustrated in FIG. 3, the capacity of the memory, 128 gigabytes (GB), of the back-up server 21, the name of which is the back-up server, is registered in the entry of the "memory capacity" in the first record of the allowable load quantity table 13a. As illustrated in FIG. 3, the capacity of the memory, 32 GB, of the management target server 22, the name of which is the management target server A, is registered in the entry of the "memory capacity" in the second record of the allowable load quantity table 13a. As illustrated in FIG. 3, the capacity of the memory, 64 GB, of the management target server 23, the name of which is the management target server B, is registered in the entry of the "memory capacity" in the third record of the allowable load quantity table 13a. As illustrated in FIG. 3, the capacity of the memory, 16 GB, of the management target server 24, the name of which is the management target server C, is registered in the entry of the "memory capacity" in the fourth record of the allowable load quantity table 13a.

Bands of any lines of lines 28a to 28e connected to each server of the back-up server 21 and the management target servers 22 to 24 are registered in the entry of the "network band (SAN)". As illustrated in FIG. 3, the following content is registered in the entry "network band (SAN)" in the first record of the allowable load quantity table 13a. That is, the band, 8 gigabits per second (Gbps), of the line 28a, the name of which is a route 1, connected to the back-up server 21, the name of which is the back-up server, is registered. As illustrated in FIG. 3, the band, 8 Gbps, of the line 28b, the name of which is a route 2, connected to the back-up server 21, the name of which is the back-up server, is registered in the entry of the "network band (SAN)" in the first record of the allowable load quantity table 13a. As illustrated in FIG. 3, the band, 8 Gbps, of the line 28c, the name of which is a route 3, connected to the management target server 22, the name of which is the management target server A, is registered in the entry of the "network band (SAN)" in the second record of the allowable load quantity table 13a. As illustrated in FIG. 3, the band, 8 Gbps, of the line 28d, the name of which is a route 4, connected to the management target server 23, the name of which is the management target server B, is registered in the entry of the "network band (SAN)" in the third record of the allowable load quantity table 13a. As illustrated in FIG. 3, the band, 4 Gbps, of the line 28e, the name of which is a route 5, connected to the management target server 24, the name of which is the management target server C, is registered in the entry of the "network band (SAN)" in the fourth record of the allowable load quantity table 13a.

The description is based on FIG. 2 again. Correspondences of identifiers of the back-up programs A to D executed by the virtual machines 21a to 21d, and names of the lines used when the virtual machines 21a to 21d execute the back-up programs A to D, are registered in the correspondence relation table 13b. FIG. 4 is a diagram illustrating an example of a data structure of the correspondence relation table. The correspondence relation table 13b illustrated in the example of FIG. 4 includes entries of a "back-up program" and a "network route (SAN)".

The identifiers of the back-up programs A to D executed by the virtual machines 21a to 21d are registered in the entry of the "back-up program" by the control unit 14. As illustrated in FIG. 4, an identifier A of the back-up program A executed by the virtual machine 21a is registered in the entry of the "back-up program" in a first record of the correspondence relation table 13b. As illustrated in FIG. 4, an identifier B of the back-up program B executed by the virtual machine 21b is registered in the entry of the "back-up program" in a second record of the correspondence relation table 13b. As illustrated in FIG. 4, an identifier C of the back-up program C executed by the virtual machine 21c is registered in the entry of the "back-up program" in a third record of the correspondence relation table 13b. As illustrated in FIG. 4, an identifier D of the back-up program D executed by the virtual machine 21d is registered in the entry of the "back-up program" in a fourth record of the correspondence relation table 13b.

The names of the lines used when the virtual machines 21a to 21d for executing the back-up programs A to D execute the back-up programs A to D, are registered in the entry of the "network route (SAN)" by the control unit 14. As illustrated in FIG. 4, the route 1 which is the name of the line 28a is registered in the entry of the "network route (SAN)" in the first record of the correspondence relation table 13b. As illustrated in FIG. 4, the route 2 which is the name of the line 28b is registered in the entry of the "network route (SAN)" in the second record of the correspondence relation table 13b. As illustrated in FIG. 4, the route 1 which is the name of the line 28a is registered in the entry of the "network route (SAN)" in the third record of the correspondence relation table 13b. As illustrated in FIG. 4, the route 2 which is the name of the line 28b is registered in the entry of the "network route (SAN)" in the fourth record of the correspondence relation table 13b.

That is, the first record of the correspondence relation table 13b illustrated in the example of FIG. 4 indicates that the virtual machine 21a for executing the back-up program A, the identifier of which is A, uses the line 28a, the name of which is the route 1, when executing the back-up program A. The second record of the correspondence relation table 13b illustrated in the example of FIG. 4 indicates that the virtual machine 21b for executing the back-up program B, the identifier of which is B, uses the line 28b, the name of which is the route 2, when executing the back-up program B. The third record of the correspondence relation table 13b illustrated in the example of FIG. 4 indicates that the virtual machine 21c for executing the back-up program C, the identifier of which is C, uses the line 28a, the name of which is the route 1, when executing the back-up program C. The fourth record of the correspondence relation table 13b illustrated in the example of FIG. 4 indicates that the virtual machine 21d for executing the back-up program D, the identifier of which is D, uses the line 28b, the name of which is the route 2, when executing the back-up program D.

The description is based on FIG. 2 again. The loads of various resources when the virtual machines 21a to 21d execute the back-up programs A to D are registered in the load information 13c. FIG. 5 is a diagram illustrating an example of a data structure of the load information. The load information 13c illustrated in the example of FIG. 5 includes entries of a "back-up program", a "CPU load (%)", a "memory load (%)", and a "load of SAN (%)".

The identifiers of the back-up programs A to D executed by the virtual machines 21a to 21d are registered in the entry of the "back-up program" by the control unit 14. As illustrated in FIG. 5, the identifier A of the back-up program A executed by the virtual machine 21a is registered in the entry of the "back-up program" in a first record of the load information 13c. As illustrated in FIG. 5, the identifier B of the back-up program B executed by the virtual machine 21b is registered in the entry of the "back-up program" in a second record of the load information 13c. As illustrated in FIG. 5, the identifier C of the back-up program C executed by the virtual machine 21c is registered in the entry of the "back-up program" in a third record of the load information 13c. As illustrated in FIG. 5, the identifier D of the back-up program D executed by the virtual machine 21d is registered in the entry of the "back-up program" in a fourth record of the load information 13c.

The loads of the CPU of the virtual machines 21a to 21d when the virtual machines 21a to 21d execute the back-up programs A to D are registered in the entry of the "CPU load (%)" by the control unit 14. For example, average loads (%) of the CPU which will be described later are registered in the entry of the "CPU load (%)" by the control unit 14. An average load, 10%, of the CPU which will be described later is registered in the entry of the "CPU load (%)" in the first record of the load information 13c illustrated in the example of FIG. 5, by the control unit 14. An average load, 20%, of the CPU which will be described later is registered in the entry of the "CPU load (%)" in the second record of the load information 13c illustrated in the example of FIG. 5, by the control unit 14. An average load, 30%, of the CPU which will be described later is registered in the entry of the "CPU load (%)" in the third record of the load information 13c illustrated in the example of FIG. 5, by the control unit 14. An average load, 10%, of the CPU which will be described later is registered in the entry of the "CPU load (%)" in the fourth record of the load information 13c illustrated in the example of FIG. 5, by the control unit 14.

The loads of the memory of the virtual machines 21a to 21d when the virtual machines 21a to 21d execute the back-up programs A to D are registered in the entry of the "memory load (%)" by the control unit 14. For example, average loads (%) of the memory which will be described later are registered in the entry of the "memory load (%)" by the control unit 14. An average load, 20%, of the memory which will be described later is registered in the entry of the "memory load (%)" in the first record of the load information 13c illustrated in the example of FIG. 5, by the control unit 14. An average load, 20%, of the memory which will be described later is registered in the entry of the "memory load (%)" in the second record of the load information 13c illustrated in the example of FIG. 5, by the control unit 14. An average load, 30%, of the memory which will be described later is registered in the entry of the "memory load (%)" in the third record of the load information 13c illustrated in the example of FIG. 5, by the control unit 14. An average load, 20%, of the memory which will be described later is registered in the entry of the "memory load (%)" in the fourth record of the load information 13c illustrated in the example of FIG. 5, by the control unit 14.

The average loads (%) of the lines due to the virtual machine which will be described later are registered in the entry of the "load of SAN (%)" by the control unit 14. An average load, 10 (%), of the line 28a due to the virtual machine 21a which will be described later is registered in the entry of the "load of SAN (%)" in the first record of the load information 13c illustrated in the example of FIG. 5, by the control unit 14. An average load, 5 (%), of the line 28b due to the virtual machine 21b which will be described later is registered in the entry of the "load of SAN (%)" in the second record of the load information 13c illustrated in the example of FIG. 5, by the control unit 14. An average load, 30 (%), of the line 28a due to the virtual machine 21c which will be described later is registered in the entry of the "load of SAN (%)" in the third record of the load information 13c illustrated in the example of FIG. 5, by the control unit 14. An average load, 95 (%), of the line 28b due to the virtual machine 21d which will be described later is registered in the entry of the "load of SAN (%)" in the fourth record of the load information 13c illustrated in the example of FIG. 5, by the control unit 14.

The description is based on FIG. 2 again. Days and time zones when the back-up processes of the data in the system areas of the virtual machines 22a, 22b, 23a, and 24a are performed are registered in the back-up information 13d.

FIG. 6 is a diagram illustrating an example of a data structure of the back-up information.

The back-up information 13d illustrated in the example of FIG. 6 includes entries of a "day" and a "back-up time zone". The information items indicating any one of Monday, Tuesday, Wednesday, Thursday, Friday, Saturday, and Sunday are registered in the entry of the "day". For example, as illustrated in FIG. 6, "Mon" indicating Monday is registered in the entry of the "day" in a first record of the back-up information 13d. As illustrated in FIG. 6, "Tue" indicating Tuesday is registered in the entry of the "day" in a second record of the back-up information 13d. As illustrated in FIG. 6, "Wed" indicating Wednesday is registered in the entry of the "day" in a third record of the back-up information 13d. As illustrated in FIG. 6, "Thu" indicating Thursday is registered in the entry of the "day" in a fourth record of the back-up information 13d. As illustrated in FIG. 6, "Fri" indicating Friday is registered in the entry of the "day" in a fifth record of the back-up information 13d. As illustrated in FIG. 6, "Sat" indicating Saturday is registered in the entry of the "day" in a sixth record of the back-up information 13d. As illustrated in FIG. 6, "Sun" indicating Sunday is registered in the entry of the "day" in a seventh record of the back-up information 13d.

In addition, the time zones of the back-up processes are registered in the entry of the "back-up time zone". For example, as illustrated in FIG. 6, a time zone of the back-up process from 12:00 am to 5:00 am is registered in the entry of the "back-up time zone" in the first record of the back-up information 13d. As illustrated in FIG. 6, a time zone of the back-up process from 2:00 am to 5:00 am is registered in the entry of the "back-up time zone" in the second record of the back-up information 13d. As illustrated in FIG. 6, a time zone of the back-up process from 2:00 am to 5:00 am and a time zone of the back-up process from 10:00 pm to 12:00 am are registered in the entry of the "back-up time zone" in the third record of the back-up information 13d. As illustrated in FIG. 6, a time zone of the back-up process from 12:00 am to 5:00 am is registered in the entry of the "back-up time zone" in the fourth record of the back-up information 13d. As illustrated in FIG. 6, a time zone of the back-up process from 2:00 am to 5:00 am is registered in the entry of the "back-up time zone" in the fifth record of the back-up information 13d. As illustrated in FIG. 6, a time zone of the back-up process from 4:00 am to 7:00 am and a time zone of the back-up process from 9:00 pm to 12:00 am are registered in the entry of the "back-up time zone" in the sixth record of the back-up information 13d. As illustrated in FIG. 6, a time zone of the back-up process from 12:00 am to 7:00 am and a time zone of the back-up process from 9:00 pm to 12:00 am are registered in the entry of the "back-up time zone" in the seventh record of the back-up information 13d.

That is, the first record of the back-up information 13d illustrated in the example of FIG. 6 indicates that the back-up process of the data in the system area of the virtual machines 22a, 22b, 23a, and 24a is performed on Monday within the regulated time from 12:00 am to 5:00 am. The second record of the back-up information 13d illustrated in the example of FIG. 6 indicates that the back-up process of the data in the system area of the virtual machines 22a, 22b, 23a, and 24a is performed on Tuesday within the regulated time from 2:00 am to 5:00 am. The third record of the back-up information 13d illustrated in the example of FIG. 6 indicates that the back-up process of the data in the system area of the virtual machines 22a, 22b, 23a, and 24a is performed on Wednesday within the regulated time from 2:00 am to 5:00 am. The third record of the back-up information 13d illustrated in the example of FIG. 6 also indicates that the back-up process of the data in the system area of the virtual machines 22a, 22b, 23a, and 24a is performed on Wednesday within the regulated time from 10:00 pm to 12:00 am. The fourth record of the back-up information 13d illustrated in the example of FIG. 6 indicates that the back-up process of the data in the system area of the virtual machines 22a, 22b, 23a, and 24a is performed on Thursday within the regulated time from 12:00 am to 5:00 am. The fifth record of the back-up information 13d illustrated in the example of FIG. 6 indicates that the back-up process of the data in the system area of the virtual machines 22a, 22b, 23a, and 24a is performed on Friday within the regulated time from 2:00 am to 5:00 am. The sixth record of the back-up information 13d illustrated in the example of FIG. 6 indicates that the back-up process of the data in the system area of the virtual machines 22a, 22b, 23a, and 24a is performed on Saturday within the regulated time from 4:00 am to 7:00 am. The sixth record of the back-up information 13d illustrated in the example of FIG. 6 also indicates that the back-up process of the data in the system area of the virtual machines 22a, 22b, 23a, and 24a is performed on Saturday within the regulated time from 9:00 pm to 12:00 am. The seventh record of the back-up information 13d illustrated in the example of FIG. 6 indicates that the back-up process of the data in the system area of the virtual machines 22a, 22b, 23a, and 24a is performed on Sunday within the regulated time from 12:00 am to 7:00 am. The seventh record of the back-up information 13d illustrated in the example of FIG. 6 also indicates that the back-up process of the data in the system area of the virtual machines 22a, 22b, 23a, and 24a is performed on Sunday within the regulated time from 9:00 pm to 12:00 am.

The description is based on FIG. 2 again. Names of the virtual machines 22a, 22b, 23a, and 24a and sizes of data items in the system areas of the virtual machines 22a, 22b, 23a, and 24a are registered in the size information 13e.

FIG. 7 is a diagram illustrating an example of a data structure of the size information. The size information 13e illustrated in the example of FIG. 7 includes entries of a "virtual machine name of back-up target" and a "size of data in system area". Names of the virtual machines 22a, 22b, 23a, and 24a are registered in the entry of the "virtual machine name of back-up target". For example, as illustrated in FIG. 7, an operation A which is the name of the virtual machine 22a is registered in the entry of the "virtual machine name of back-up target" in a first record of the size information 13e. As illustrated in FIG. 7, an operation B which is the name of the virtual machine 22b is registered in the entry of the "virtual machine name of back-up target" in a second record of the size information 13e. As illustrated in FIG. 7, an operation C which is the name of the virtual machine 23a is registered in the entry of the "virtual machine name of back-up target" in a third record of the size information 13e. As illustrated in FIG. 7, an operation D which is the name of the virtual machine 24a is registered in the entry of the "virtual machine name of back-up target" in a fourth record of the size information 13e.

Sizes of the data items in the system areas of the virtual machines 22a, 22b, 23a, and 24a which are back-up targets are registered in the entry of the "size of data in system area". For example, as illustrated in FIG. 7, a size, 20 GB, of the data in the system area of the virtual machine 22a, the name of which is the operation A, is registered in the entry of the "size of data in system area" in the first record of the size information 13e. As illustrated in FIG. 7, a size, 30 GB, of the data in the system area of the virtual machine 22b, the name of which is the operation B, is registered in the entry of the "size of data in system area" in the second record of the size information 13e. As illustrated in FIG. 7, a size, 10 GB, of the data in the system area of the virtual machine 23a, the name of which is the operation C, is registered in the entry of the "size of data in system area" in the third record of the size information 13e. As illustrated in FIG. 7, a size, 50 GB, of the data in the system area of the virtual machine 24a, the name of which is the operation D, is registered in the entry of the "size of data in system area" in the fourth record of the size information 13e.

The memory unit 13 is, for example, a semiconductor memory element such as a flash memory or a memory device such as a hard disk or an optical disk.

By returning to the description of FIG. 2, the control unit 14 includes an internal memory for storing programs or control data items for regulating various process procedures, and executes various processes with the programs and data items. As illustrated in FIG. 2, the control unit 14 includes an acquisition unit 14a, a first specifying unit 14b, a second specifying unit 14c, and a movement control unit 14d.

The acquisition unit 14a acquires band loads of the plurality of lines 28a and 28b, resource usages of the plurality of management target servers 22 to 24, and percentages of completion indicating a degree of completion of the back-up process executed by the plurality of virtual machines 21a to 21d.

An embodiment of the acquisition unit 14a will be described. The acquisition unit 14a determines whether or not the current time is in the time zone for performing the back-up process registered in the back-up information 13d at predetermined time intervals (for example, at every 30 seconds), with reference to the back-up information 13d.

When it is determined that the current time is in the time zone for performing the back-up process registered in the back-up information 13d, that is, when it is determined that the current time is in the time zone when the virtual machines 21a to 21d perform the back-up process, the acquisition unit 14a performs the following process. That is, the acquisition unit 14a acquires maximum allowable quantities of the loads of various resources (CPU, memory, and lines connected to each server) of each server of the back-up server 21 and the management target servers 22 to 24 from the allowable load quantity table 13a. For example, when the allowable load quantity table 13a illustrated in the example of FIG. 3 is stored in the memory unit 13, the acquisition unit 14a performs the following process. That is, the acquisition unit 14a specifies the record in which the back-up server is registered in the entry of the "physical server name", and acquires the operation frequency, 4 GHz, and the number of cores, 32, registered in the entry of the "CPU power" of the specified record, as the maximum allowable quantities of the load of the CPU of the back-up server 21. The acquisition unit 14a acquires the capacity of the memory, 128 GB, registered in the entry of the "memory capacity" of the specified record, as the maximum allowable quantity of the load of the memory of the back-up server 21. The acquisition unit 14a acquires the band, 8 Gbps, of the line 28a, the name of which is the route 1 and the band, 8 Gbps, of the line 28b, the name of which is the route 2, registered in the entry of the "network band (SAN)" of the specified record, as the following values. That is, the acquisition unit 14a acquires the band, 8 Gbps, of the line 28a, the name of which is the route 1 and the band, 8 Gbps, of the line 28b, the name of which is the route 2, as the maximum allowable quantities of the loads of the lines connected to the back-up server 21.

In addition, the acquisition unit 14a specifies the record in which the management target server A is registered in the entry of the "physical server name". The acquisition unit 14a acquires the operation frequency, 4 GHz, and the number of cores, 12, of the CPU as the maximum allowable quantities of the load of the CPU of the management target server 22, by performing the same process as the process described above with respect to the specified record. The acquisition unit 14a acquires the capacity of the memory, 32 GB, as the maximum allowable quantity of the load of the memory of the management target server 22, by performing the same process as the process described above with respect to the specified record. The acquisition unit 14a acquires the band, 8 Gbps, of the line 28c, the name of which is the route 3, as the maximum allowable quantity of the load of the line connected to the management target server 22, by performing the same process as the process described above with respect to the specified record.

In addition, the acquisition unit 14a specifies the record in which the management target server B is registered in the entry of the "physical server name". The acquisition unit 14a acquires the operation frequency, 4 GHz, and the number of cores, 24, of the CPU as the maximum allowable quantities of the load of the CPU of the management target server 23, by performing the same process as the process described above with respect to the specified record. The acquisition unit 14a acquires the capacity of the memory, 64 GB, as the maximum allowable quantity of the load of the memory of the management target server 23, by performing the same process as the process described above with respect to the specified record. The acquisition unit 14a acquires the band, 8 Gbps, of the line 28d, the name of which is the route 4, as the maximum allowable quantity of the load of the line connected to the management target server 23, by performing the same process as the process described above with respect to the specified record.

In addition, the acquisition unit 14a specifies the record in which the management target server C is registered in the entry of the "physical server name". The acquisition unit 14a acquires the operation frequency, 4 GHz, and the number of cores, 8, of the CPU as the maximum allowable quantities of the load of the CPU of the management target server 24, by performing the same process as the process described above with respect to the specified record. The acquisition unit 14a acquires the capacity of the memory, 16 GB, as the maximum allowable quantity of the load of the memory of the management target server 24, by performing the same process as the process described above with respect to the specified record. The acquisition unit 14a acquires the band, 4 Gbps, of the line 28e, the name of which is the route 5, as the maximum allowable quantity of the load of the line connected to the management target server 24, by performing the same process as the process described above with respect to the specified record.

With the method described above, the acquisition unit 14a acquires the maximum allowable quantities of the loads of the various resources of servers of the back-up server 21 and the management target servers 22 to 24, from the allowable load quantity table 13a.

Next, the acquisition unit 14a registers various information items in the correspondence relation table 13b and executes a correspondence relation table generation process of generating the correspondence relation table 13b. In the correspondence relation table generation process, the acquisition unit 14a, first, calculates the total of maximum bands of the lines 28a and 28b connected to the back-up server 21. The acquisition unit 14a, for example, calculates the total of the bands of the lines 28a and 28b previously acquired. When the allowable load quantity table 13a illustrated in the example of FIG. 3 is stored in the memory unit 13, the acquisition unit 14a calculates the total of the bands, 16 Gbps ((8+8) Gbps) of the lines 28a and 28b.

In the correspondence relation table generation process, the acquisition unit 14a calculates each rate of the bands of the lines 28a and 28b with respect to the calculated total of the bands. When the allowable load quantity table 13a illustrated in the example of FIG. 3 is stored in the memory unit 13, the acquisition unit 14a calculates 8/16 as a rate of the band of the line 28a with respect to the total. In addition, the acquisition unit 14a calculates 8/16 as a rate of the band of the line 28b with respect to the total.

In the correspondence relation table generation process, the acquisition unit 14a specifies the virtual machine for executing the back-up process. For example, as illustrated in FIG. 1, when four virtual machines 21a to 21d execute the back-up process, the acquisition unit 14a specifies the virtual machines 21a to 21d for executing the back-up process.

In the correspondence relation table generation process, the acquisition unit 14a selects all of the specified virtual machines one by one. Every time the virtual machine is selected, the acquisition unit 14a associates the selected machine with the lines 28a and 28b, according to the calculated rate. For example, when 8/16 is calculated as the rate of the band of the line 28a with respect to the total and 8/16 is calculated as the rate of the band of the line 28b with respect to the total, the acquisition unit 14a performs the following process. That is, the acquisition unit 14a associates the virtual machine selected with a possibility of 50% with respect to the line 28a and 50% with respect to the line 28b with any line of the line 28a and line 28b. Accordingly, the lines are associated with respect to all of the specified virtual machines.

In the correspondence relation table generation process, the acquisition unit 14a registers the association of the virtual machines and the lines in the correspondence relation table 13b. For example, when the virtual machines 21a and 21c are associated with the line 28a and the virtual machines 21b and 21d are associated with the line 28b, the acquisition unit 14a performs the following process. That is, as previously illustrated in FIG. 4, the acquisition unit 14a registers the identifier A of the back-up program A executed by the virtual machine 21a in the entry of the "back-up program" of the correspondence relation table 13b. The acquisition unit 14a registers the route 1 which is the name of the line 28a, in the entry of the "network route (SAN)" of the record in which the identifier A is registered in the entry of the "back-up program". As previously illustrated in FIG. 4, the acquisition unit 14a registers the identifier B of the back-up program B executed by the virtual machine 21b in the entry of the "back-up program" of the correspondence relation table 13b. The acquisition unit 14a registers the route 2 which is the name of the line 28b, in the entry of the "network route (SAN)" of the record in which the identifier B is registered in the entry of the "back-up program". As previously illustrated in FIG. 4, the acquisition unit 14a registers the identifier C of the back-up program C executed by the virtual machine 21c in the entry of the "back-up program" of the correspondence relation table 13b. The acquisition unit 14a registers the route 1 which is the name of the line 28a, in the entry of the "network route (SAN)" of the record in which the identifier C is registered in the entry of the "back-up program". As previously illustrated in FIG. 4, the acquisition unit 14a registers the identifier D of the back-up program D executed by the virtual machine 21d in the entry of the "back-up program" of the correspondence relation table 13b. The acquisition unit 14a registers the route 2 which is the name of the line 28b, in the entry of the "network route (SAN)" of the record in which the identifier D is registered in the entry of the "back-up program".

As described above, the correspondence relation table 13b is generated by executing the correspondence relation table generation process.

When the correspondence relation table 13b is generated, the acquisition unit 14a controls so that the virtual machines 21a to 21d start the back-up process. For example, when the correspondence relation table 13b is generated, the acquisition unit 14a transmits an instruction of causing the virtual machine 21a to execute the back-up program A, to the VM host 21e. The VM host 21e which received such an instruction transmits the instruction of executing the back-up program A to the virtual machine 21a. The virtual machine 21a which received the instruction of executing the back-up program A, executes the back-up program A according to the instruction. That is, the virtual machine 21a executes the back-up process. In the back-up process, the virtual machine 21a acquires data in the system area of the virtual machine 22a from the storage 26a of the storage server 26, and transmits the acquired data in the system area to the storage server 27 through the line 28a and the FC switch 25. Therefore, the data in the system area of the virtual machine 22a is stored in the back-up storage 27a, and the data in the system area of the virtual machine 22a is duplicated.

When the correspondence relation table 13b is generated, the acquisition unit 14a transmits an instruction of causing the virtual machine 21b to execute the back-up program B, to the VM host 21e. The VM host 21e which received such an instruction transmits the instruction of executing the back-up program B to the virtual machine 21b. The virtual machine 21b which received the instruction of executing the back-up program B, executes the back-up program B according to the instruction. That is, the virtual machine 21b executes the back-up process. In the back-up process, the virtual machine 21b acquires data in the system area of the virtual machine 22b from the storage 26a of the storage server 26, and transmits the acquired data in the system area to the storage server 27 through the line 28b and the FC switch 25. Therefore, the data in the system area of the virtual machine 22b is stored in the back-up storage 27a, and the data in the system area of the virtual machine 22b is duplicated.

When the correspondence relation table 13b is generated, the acquisition unit 14a transmits an instruction of causing the virtual machine 21c to execute the back-up program C, to the VM host 21e. The VM host 21e which received such an instruction transmits the instruction of executing the back-up program C to the virtual machine 21c. The virtual machine 21c which received the instruction of executing the back-up program C, executes the back-up program C according to the instruction. That is, the virtual machine 21c executes the back-up process. In the back-up process, the virtual machine 21c acquires data in the system area of the virtual machine 23a from the storage 26a of the storage server 26, and transmits the acquired data in the system area to the storage server 27 through the line 28a and the FC switch 25. Therefore, the data in the system area of the virtual machine 23a is stored in the back-up storage 27a, and the data in the system area of the virtual machine 23a is duplicated.

When the correspondence relation table 13b is generated, the acquisition unit 14a transmits an instruction of causing the virtual machine 21d to execute the back-up program D, to the VM host 21e. The VM host 21e which received such an instruction transmits the instruction of executing the back-up program D to the virtual machine 21d. The virtual machine 21d which received the instruction of executing the back-up program D, executes the back-up program D according to the instruction. That is, the virtual machine 21d executes the back-up process. In the back-up process, the virtual machine 21d acquires data in the system area of the virtual machine 24a from the storage 26a of the storage server 26, and transmits the acquired data in the system area to the storage server 27 through the line 28b and the FC switch 25. Therefore, the data in the system area of the virtual machine 24a is stored in the back-up storage 27a, and the data in the system area of the virtual machine 24a is duplicated.

The acquisition unit 14a starts the measurement of the loads of various resources when the virtual machines 21a to 21d execute the back-up programs A to D. The acquisition unit 14a registers the measured loads of various resources to the load information 13c. The acquisition unit 14a, for example, starts measuring the usages (GHz) of the CPU of the virtual machine 21a which executes the back-up program A, at predetermined time intervals (for example, at every 3 seconds). The acquisition unit 14a performs the following process each time when measuring the usage (GHz) of the CPU. That is, the acquisition unit 14a calculates an average value of the usages of the CPU measured within the last 5 minutes from the current time, and calculates a value obtained by multiplying 100 by a value obtained by dividing the calculated average value by the operation frequency, 4 GHz, of the CPU of the back-up server 21, as an average load (%) of the CPU of the virtual machine 21a. For example, when the average value of the usages of the CPU of the virtual machine 21a measured within the last 5 minutes from the current time is 0.4 GHz, the acquisition unit 14a calculates the average load of the CPU of the virtual machine 21a as 10%. The acquisition unit 14a associates the average load with the identifier A of the back-up program A and overwrites and registers the average load of the CPU of the virtual machine 21a in the load information 13c.

The acquisition unit 14a starts measuring the usages (GHz) of the CPU of the virtual machine 21b which executes the back-up program B, at predetermined time intervals (for example, at every 3 seconds). The acquisition unit 14a performs the following process each time when measuring the usage (GHz) of the CPU. That is, the acquisition unit 14a calculates an average value of the usages of the CPU measured within the last 5 minutes from the current time, and calculates a value obtained by multiplying 100 by a value obtained by dividing the calculated average value by the operation frequency, 4 GHz, of the CPU of the back-up server 21, as an average load (%) of the CPU of the virtual machine 21b. The acquisition unit 14a associates the average load with the identifier B of the back-up program B and overwrites and registers the average load of the CPU of the virtual machine 21b in the load information 13c.

The acquisition unit 14a starts measuring the usages (GHz) of the CPU of the virtual machine 21c which executes the back-up program C, at predetermined time intervals (for example, at every 3 seconds). The acquisition unit 14a performs the following process each time when measuring the usage (GHz) of the CPU. That is, the acquisition unit 14a calculates an average value of the usages of the CPU measured within the last 5 minutes from the current time, and calculates a value obtained by multiplying 100 by a value obtained by dividing the calculated average value by the operation frequency, 4 GHz, of the CPU of the back-up server 21, as an average load (%) of the CPU of the virtual machine 21*c*. The acquisition unit 14*a* associates the average load with the identifier C of the back-up program C and overwrites and registers the average load of the CPU of the virtual machine 21*c* in the load information 13*c*.

The acquisition unit 14*a* starts measuring the usages (GHz) of the CPU of the virtual machine 21*d* which executes the back-up program D, at predetermined time intervals (for example, at every 3 seconds). The acquisition unit 14*a* performs the following process each time when measuring the usage (GHz) of the CPU. That is, the acquisition unit 14*a* calculates an average value of the usages of the CPU measured within the last 5 minutes from the current time, and calculates a value obtained by multiplying 100 by a value obtained by dividing the calculated average value by the operation frequency, 4 GHz, of the CPU of the back-up server 21, as an average load (%) of the CPU of the virtual machine 21*d*. The acquisition unit 14*a* associates the average load with the identifier D of the back-up program D and overwrites and registers the average load of the CPU of the virtual machine 21*d* in the load information 13*c*.

The acquisition unit 14*a* starts measuring the usages (GB) of the memory of the virtual machine 21*a* which executes the back-up program A, at predetermined time intervals (for example, at every 3 seconds). The acquisition unit 14*a* performs the following process each time when measuring the usage (GB) of the memory. That is, the acquisition unit 14*a* calculates an average value of the usages of the memory measured within the last 5 minutes from the current time, and calculates a value obtained by multiplying 100 by a value obtained by dividing the calculated average value by the capacity, 128 GB, of the memory of the back-up server 21, as an average load (%) of the memory of the virtual machine 21*a*. For example, when the average value of the usages of the memory of the virtual machine 21*a* measured within the last 5 minutes from the current time is 25.6 GB, the acquisition unit 14*a* calculates the average load of the memory of the virtual machine 21*a* as 20%. The acquisition unit 14*a* associates the average load with the identifier A of the back-up program A and overwrites and registers the average load of the memory of the virtual machine 21*a* in the load information 13*c*.

The acquisition unit 14*a* starts measuring the usages (GB) of the memory of the virtual machine 21*b* which executes the back-up program B, at predetermined time intervals (for example, at every 3 seconds). The acquisition unit 14*a* performs the following process each time when measuring the usage (GB) of the memory. That is, the acquisition unit 14*a* calculates an average value of the usages of the memory measured within the last 5 minutes from the current time, and calculates a value obtained by multiplying 100 by a value obtained by dividing the calculated average value by the capacity, 128 GB, of the memory of the back-up server 21, as an average load (%) of the memory of the virtual machine 21*b*. The acquisition unit 14*a* associates the average load with the identifier B of the back-up program B and overwrites and registers the average load of the memory of the virtual machine 21*b* in the load information 13*c*.

The acquisition unit 14*a* starts measuring the usages (GB) of the memory of the virtual machine 21*c* which executes the back-up program C, at predetermined time intervals (for example, at every 3 seconds). The acquisition unit 14*a* performs the following process each time when measuring the usage (GB) of the memory. That is, the acquisition unit 14*a* calculates an average value of the usages of the memory measured within the last 5 minutes from the current time, and calculates a value obtained by multiplying 100 by a value obtained by dividing the calculated average value by the capacity, 128 GB, of the memory of the back-up server 21, as an average load (%) of the memory of the virtual machine 21*c*. The acquisition unit 14*a* associates the average load with the identifier C of the back-up program C and overwrites and registers the average load of the memory of the virtual machine 21*c* in the load information 13*c*.

The acquisition unit 14*a* starts measuring the usages (GB) of the memory of the virtual machine 21*d* which executes the back-up program D, at predetermined time intervals (for example, at every 3 seconds). The acquisition unit 14*a* performs the following process each time when measuring the usage (GB) of the memory. That is, the acquisition unit 14*a* calculates an average value of the usages of the memory measured within the last 5 minutes from the current time, and calculates a value obtained by multiplying 100 by a value obtained by dividing the calculated average value by the capacity, 128 GB, of the memory of the back-up server 21, as an average load (%) of the memory of the virtual machine 21*d*. The acquisition unit 14*a* associates the average load with the identifier D of the back-up program D and overwrites and registers the average load of the memory of the virtual machine 21*d* in the load information 13*c*.

The acquisition unit 14*a* performs the following process at predetermined time intervals (for example, at every 3 seconds). For example, the acquisition unit 14*a* starts measuring data quantity (Gbps) of the back-up target data flowing, for 1 second, to the line 28*a* used when the virtual machine 21*a* for executing the back-up program A executes the back-up process. Herein, the back-up target data indicates data in the system area of the virtual machine 22*a*. The acquisition unit 14*a* performs the following process each time when measuring the data quantity. That is, the acquisition unit 14*a* calculates an average value of the data quantities measured within the last 5 minutes from the current time, and calculates a value obtained by multiplying 100 by a value obtained by dividing the calculated average value of the data quantities by the band, 8 Gbps, of the line 28*a*, as an average load (%) of the line 28*a* due to the virtual machine 21*a*. For example, when the average value of the data quantities of the back-up target data measured within the last 5 minutes from the current time for 1 second is 0.8 Gbps, the acquisition unit 14*a* calculates the average load of the line 28*a* due to the virtual machine 21*a* as 10%. The acquisition unit 14*a* associates the average load with the identifier A of the back-up program A and overwrites and registers the average load of the line 28*a* due to the virtual machine 21*a* in the load information 13*c*.

The acquisition unit 14*a* performs the following process at predetermined time intervals (for example, at every 3 seconds). For example, the acquisition unit 14*a* starts measuring data quantity (Gbps) of the back-up target data flowing, for 1 second, to the line 28*b* used when the virtual machine 21*b* for executing the back-up program B executes the back-up process. Herein, the back-up target data indicates data in the system area of the virtual machine 22*b*. The acquisition unit 14*a* performs the following process each time when measuring the data quantity. That is, the acquisition unit 14*a* calculates an average value of the data quantities measured within the last 5 minutes from the current time, and calculates a value obtained by multiplying 100 by a value obtained by dividing the calculated average value of the data quantities by the band, 8 Gbps, of the line 28b, as an average load (%) of the line 28b due to the virtual machine 21b. The acquisition unit 14a associates the average load with the identifier B of the back-up program B and overwrites and registers the average load of the line 28b due to the virtual machine 21b in the load information 13c.

The acquisition unit 14a performs the following process at predetermined time intervals (for example, at every 3 seconds). For example, the acquisition unit 14a starts measuring data quantity (Gbps) of the back-up target data flowing, for 1 second, to the line 28a used when the virtual machine 21c for executing the back-up program C executes the back-up process. Herein, the back-up target data indicates data in the system area of the virtual machine 23a. The acquisition unit 14a performs the following process each time when measuring the data quantity. That is, the acquisition unit 14a calculates an average value of the data quantities measured within the last 5 minutes from the current time, and calculates a value obtained by multiplying 100 by a value obtained by dividing the calculated average value of the data quantities by the band, 8 Gbps, of the line 28a, as an average load (%) of the line 28a due to the virtual machine 21c. The acquisition unit 14a associates the average load with the identifier C of the back-up program C and overwrites and registers the average load of the line 28a due to the virtual machine 21c in the load information 13c.

The acquisition unit 14a performs the following process at predetermined time intervals (for example, at every 3 seconds). For example, the acquisition unit 14a starts measuring data quantity (Gbps) of the back-up target data flowing, for 1 second, to the line 28b used when the virtual machine 21d for executing the back-up program D executes the back-up process. Herein, the back-up target data indicates data in the system area of the virtual machine 24a. The acquisition unit 14a performs the following process each time when measuring the data quantity. That is, the acquisition unit 14a calculates an average value of the data quantities measured within the last 5 minutes from the current time, and calculates a value obtained by multiplying 100 by a value obtained by dividing the calculated average value of the data quantities by the band, 8 Gbps, of the line 28b, as an average load (%) of the line 28b due to the virtual machine 21d. The acquisition unit 14a associates the average load with the identifier D of the back-up program D and overwrites and registers the average load of the line 28b due to the virtual machine 21d in the load information 13c.

With the method described above, the acquisition unit 14a starts measuring the loads of various resources when the virtual machines 21a to 21d execute the back-up programs A to D, and starts updating the loads of various resources in the load information 13c.

In addition, when it is determined that the first specifying unit 14b which will be described later determines that there is an average load exceeding a predetermined value (for example, 90%) among various average loads registered in the load information 13c, the acquisition unit 14a performs the following process. That is, the acquisition unit 14a acquires the sizes of the data items in the system areas of the virtual machines 22a, 22b, 23a, and 24a, from the size information 13e. Next, the acquisition unit 14a specifies the data quantity of the data in the system area of the virtual machine 22a which has been transmitted to the storage 27. The acquisition unit 14a calculates a value obtained by multiplying 100 by a value obtained by dividing the specified data quantity by the size of the data in the system area of the virtual machine 22a, as the percentage of completion (%) of the back-up process of the virtual machine 21a. Next, the acquisition unit 14a specifies the data quantity of the data in the system area of the virtual machine 22b which has been transmitted to the storage 27. The acquisition unit 14a calculates a value obtained by multiplying 100 by a value obtained by dividing the specified data quantity by the size of the data in the system area of the virtual machine 22b, as the percentage of completion (%) of the back-up process of the virtual machine 21b. Next, the acquisition unit 14a specifies the data quantity of the data in the system area of the virtual machine 23a which has been transmitted to the storage 27. The acquisition unit 14a calculates a value obtained by multiplying 100 by a value obtained by dividing the specified data quantity by the size of the data in the system area of the virtual machine 23a, as the percentage of completion (%) of the back-up process of the virtual machine 21c. Next, the acquisition unit 14a specifies the data quantity of the data in the system area of the virtual machine 24a which has been transmitted to the storage 27. The acquisition unit 14a calculates a value obtained by multiplying 100 by a value obtained by dividing the specified data quantity by the size of the data in the system area of the virtual machine 24a, as the percentage of completion (%) of the back-up process of the virtual machine 21d. The percentage of completion of the back-up process is a value indicating a degree of completion of the back-up process. By doing so, the acquisition unit 14a acquires the percentages of completion of the back-up process.

When an increase of at least one used band of the plurality of lines 28a and 28b is detected and delay of the back-up process using the line with the detected increase of the used band is detected, the first specifying unit 14b performs the following process. That is, the first specifying unit 14b specifies any virtual machine which performs the back-up process by using the line with the detected increase of the used band. At that time, the first specifying unit 14b specifies the virtual machine based on the correspondence relation between the plurality of lines 28a and 28b and the virtual machines 21a to 21d which perform the back-up process using the lines 28a and 28b. Herein, for example, when the back-up process is delayed, the back-up process is not completed within the regulated time.

An embodiment of the first specifying unit 14b will be described. For example, when the measurement of the loads of various resources and updating of the loads of various resources in the load information 13c described above are started by the acquisition unit 14a, the first specifying unit 14b performs the following process. That is, the first specifying unit 14b determines whether or not there is an average load exceeding a predetermined value, for example, 90%, among the average loads of the CPU of the virtual machines 21a to 21d registered in the load information 13c. The first specifying unit 14b determines whether or not there is an average load exceeding a predetermined value, for example, 90%, among the average loads of the memory of the virtual machines 21a to 21d registered in the load information 13c. In addition, the first specifying unit 14b calculates the total of the average load of the line 28a due to the virtual machine 21a and the average load of the line 28a due to the virtual machine 21c registered in the load information 13c, as an average load of the line 28a. Further, the first specifying unit 14b calculates the total of the average load of the line 28b due to the virtual machine 21b and the average load of the line 28b due to the virtual machine 21d registered in the load information 13c, as an average load of the line 28b. Then, the first specifying unit 14b determines whether or not there is an average load exceeding a predetermined value, for example, 90%, among the average load of the line 28a and the average load of the line 28b.

When it is determined that there is an average load exceeding a predetermined value (for example, 90%), the first specifying unit 14b performs the following process. That is, the first specifying unit 14b specifies the virtual machines having the average load exceeding the predetermined value among the virtual machines 21a to 21d, and determines whether or not there is a percentage of completion equal to or smaller than a threshold value among the percentages of completion of the back-up process of the specified virtual machines. Herein, such a threshold value is a value calculated by the acquisition unit 14a, and is a value obtained by multiplying 100 by a value obtained by dividing elapsed time from the start of the back-up process to the current time by expected time of the back-up process. For example, the back-up information 13d illustrated in the example of FIG. 6 is stored in the memory unit 13, and when the day is Monday and the current time is 2:00 am, the acquisition unit 14a calculates the threshold value as follows. That is, the acquisition unit 14a multiplies 100 by a value obtained by dividing 2 hours which is the elapsed time from the start of the back-up process to the current time by 5 hours which is the expected time of the back-up process, and calculates the threshold value as 40%.

When it is determined that there is a percentage of completion equal to or smaller than a threshold value among the percentages of completion of the back-up process of the specified virtual machines, the first specifying unit 14b determines whether or not there is negative progressing acceleration among progressing acceleration (%/s*s) of the back-up process with the percentage of completion which is equal to or smaller than the threshold value. Herein, the progressing acceleration is a value calculated by the acquisition unit 14a. When it is determined by the first specifying unit 14b that there is a percentage of completion equal to or smaller than a threshold value among the percentages of completion of the back-up process of the specified virtual machines, the acquisition unit 14a calculates a rate of change of the percentage of completion for the last 5 minutes from the current time as progressing speed (%/s). The acquisition unit 14a calculates a rate of change of the progressing speed for the last 5 minutes from the current time as progressing acceleration (%/s*s).

When it is determined that there is negative progressing acceleration among the progressing acceleration in the back-up process with the percentage of completion equal to or smaller than the threshold value, the first specifying unit 14b performs the following process. That is, the first specifying unit 14b determines whether or not the average load exceeding the predetermined value (for example, 90%) is the average load of the line 28a or the average load of the line 28b.

When it is determined that the average load exceeding the predetermined value (for example, 90%) is the average load of the line 28a or the average load of the line 28b, the first specifying unit 14b performs the following process. That is, the first specifying unit 14b specifies the virtual machine corresponding to the line having the average load exceeding the predetermined value from the correspondence relation table 13b. When there is one specified virtual machine, the first specifying unit 14b specifies the specified virtual machine as a movement target virtual machine. Meanwhile, when there is the plurality of specified virtual machines, the first specifying unit 14b specifies a virtual machine having the highest average load with respect to the line with the average load exceeding the predetermined value as the movement target virtual machine, from the plurality of specified virtual machines, with reference to the load information 13c. For example, when the average load of the line 28b exceeds the predetermined value and the virtual machines 21b and 21d which corresponds to the line 28b, the name of which is the route 2, and executes the back-up programs B and D specified from the correspondence relation table 13b, the first specifying unit 14b performs the following process. That is, the first specifying unit 14b specifies the virtual machine 21d having the higher average load with respect to the line 28b with the average load exceeding the predetermined value from the virtual machines 21b and 21d as the movement target virtual machine, with reference to the load information 13c illustrated in FIG. 5. Herein, the virtual machine 21d is specified from the virtual machines 21b and 21d because the average load, 95%, of the line 28b due to the virtual machine 21d is higher than the average load, 5%, of the line 28b due to the virtual machine 21b as illustrated in the load information 13c of FIG. 5.

Meanwhile, when it is determined that the average load exceeding the predetermined value (for example, 90%) is not the average load of the line 28a and the average load of the line 28b, the first specifying unit 14b performs the following process. That is, the first specifying unit 14b specifies the virtual machine having the average load exceeding the predetermined value as the movement target virtual machine.

The second specifying unit 14c performs the following process based on the degree of completion of the back-up process. That is, when the specified movement target virtual machine is moved, the second specifying unit 14c specifies the management target server which satisfies the conditions in which the back-up process executed by the moved virtual machine is not delayed, from the plurality of management target servers 22 to 24.

An embodiment of the second specifying unit 14c will be described. For example, when the movement target virtual machine is specified by the first specifying unit 14b, the second specifying unit 14c calculates an average value of the usages of the CPU of the movement target virtual machine from the start of the back-up process to the current time measured by the acquisition unit 14a. The second specifying unit 14c calculates a first value obtained by dividing the calculated average value by the data quantity of the data in the system area of the movement target virtual machine which has been transmitted to the storage 27. The second specifying unit 14c calculates a second value obtained by multiplying the data quantity of the data in the system area of the movement target virtual machine which is not transmitted to the storage 27 by the calculated first value, as a value with the following content. That is, the second specifying unit 14c calculates the second value, as the usage (GHz) of the CPU of the management target server at the movement destination desired for completing the back-up process of the movement target virtual machine within the regulated time.

When the movement target virtual machine is specified by the first specifying unit 14b, the second specifying unit 14c calculates an average value of the usages of the memory of the movement target virtual machine from the start of the back-up process to the current time measured by the acquisition unit 14a. The second specifying unit 14c calculates a third value obtained by dividing the calculated average value by the data quantity of the data in the system area of the movement target virtual machine which has been transmitted to the storage 27. The second specifying unit 14c calculates a fourth value obtained by multiplying the data quantity of the data in the system area of the movement target virtual machine which is not transmitted to the storage 27 by the calculated third value, as a value with the following content. That is, the second specifying unit 14c calculates the fourth value, as the usage (GB) of the memory of the management target server at the movement destination desired for completing the back-up process of the movement target virtual machine within the regulated time.

When the movement target virtual machine is specified by the first specifying unit 14b, the second specifying unit 14c performs the following process. That is, the second specifying unit 14c calculates an average value of the data quantities (Gbps) of the data of the back-up target flowing, for 1 second, to the line used when the movement target virtual machine executes the back-up process from the start of the back-up process to the current time. The data quantities of the data of the back-up target flowing, for 1 second, to the line used when the movement target virtual machine executes the back-up process from the start of the back-up process to the current time, are measured by the acquisition unit 14a. The second specifying unit 14c calculates a fifth value obtained by dividing the calculated average value by the data quantity of the data in the system area of the movement target virtual machine which has been transmitted to the storage 27. The second specifying unit 14c calculates a sixth value obtained by multiplying the data quantity of the data in the system area of the movement target virtual machine which is not transmitted to the storage 27 by the calculated fifth value, as a value with the following content. That is, the second specifying unit 14c calculates the sixth value, as the band (Gbps) of the line connected to the management target server at the movement destination desired for completing the back-up process of the movement target virtual machine within the regulated time.

The second specifying unit 14c searches the management target server which satisfies three conditions described below from the management target servers 22 to 24. The first condition is a condition of including the CPU in which a usage equal to or greater than the calculated usage (GHz) of the CPU of the management target server at the movement destination may be used. The second condition is a condition of including the memory in which a usage equal to or greater than the calculated usage (GB) of the memory of the management target server at the movement destination may be used. The third condition is a condition of being connected to the line in which a band equal to or greater than the calculated band (Gbps) of the line may be used. When there is one management target server satisfying the three conditions as a result of the searching, the second specifying unit 14c specifies the obtained management target server as a management target server for moving the movement target virtual machine.

When there are the plurality of management target servers satisfying the three conditions as a result of the searching, the second specifying unit 14c performs the following process. That is, the second specifying unit 14c specifies the management target server having the smallest available usage of the CPU and the available usage of the memory from the plurality of obtained management target servers, as the management target server for moving the movement target virtual machine. Herein, an example of a factor of specifying the management target server having the smallest available usage of the CPU and the available usage of the memory as the management target server for moving the movement target virtual machine will be described. The requirement for the back-up process is to complete the process within the regulated time and not to rapidly complete the process. Accordingly, the second specifying unit 14c specifies the management target server having a small usable resource quantity, such as the management target server having the smallest available usage of the CPU and available usage of the memory, from the management target servers which complete the back-up process within the regulated time. Therefore, it is possible to suppress a decrease in the performance of the process of the virtual machine executed on the management target server, due to the movement of the virtual machine which executes the back-up process.

Meanwhile, when there is no management target server satisfying the three conditions as a result of the searching, the second specifying unit 14c performs the following process. That is, the second specifying unit 14c moves the virtual machines 22a, 22b, 23a, and 24a operated on the management target servers 22 to 24 to the specified management target server, and controls so that the available resource of any management target server from the management target servers 22 to 24 becomes greater. The second specifying unit 14c performs a process of searching the management target server satisfying the three conditions. When there is one management target server satisfying the three conditions as a result of the searching, the second specifying unit 14c specifies the obtained management target server as the management target server for moving the movement target virtual machine. In addition, when there is the plurality of management target servers satisfying the three conditions as a result of the searching, the second specifying unit 14c performs the following process. That is, the second specifying unit 14c specifies the management target server having the smallest available usage of the CPU and the available usage of the memory from the plurality of obtained management target servers, as the management target server for moving the movement target virtual machine.

When an increase of at least one used band of lines 28a and 28b is detected and delay of the back-up process using the line with the detected increase of the used band is detected based on the degree of completion of the back-up process, the movement control unit 14d performs the following process. That is, the movement control unit 14d moves any one of the virtual machines for performing the back-up process by using the line with the detected increase of the used band, to any management target server of the plurality of management target servers 22 to 24 from the back-up server 21.

Figure 8:
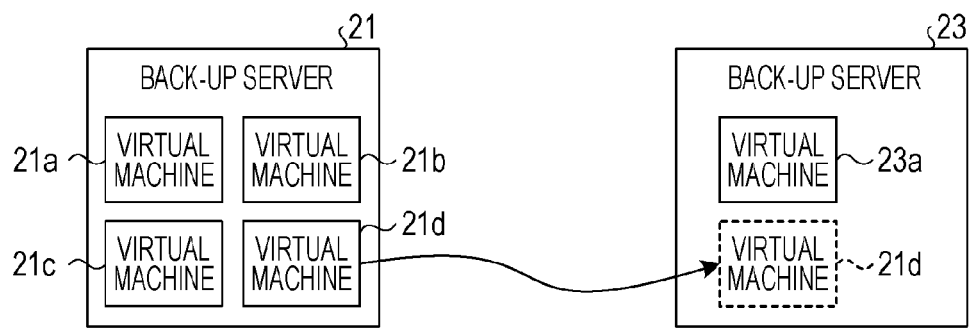
FIG. 8 is a diagram for illustrating an example of a process executed by a management server according to an example.

An embodiment of the movement control unit 14d will be described. For example, the movement control unit 14d transmits a migration instruction of moving the movement target virtual machine specified by the first specifying unit 14b to the management target server specified by the second specifying unit 14c, to the VM host 21e. Accordingly, the movement target virtual machine is moved to the management target server for moving the movement target virtual machine. For example, when the virtual machine 21d is specified as the movement target virtual machine by the first specifying unit 14b and the management target server 23 is specified as the management target server for moving the movement target virtual machine by the second specifying unit 14c, the movement control unit 14d performs the following process. That is, the movement control unit 14d transmits the migration instruction of moving the virtual machine 21d to the management target server 23, to the VM host 21e. Accordingly, as illustrated in FIG. 8, the virtual machine 21d is moved to the management target server 23. The movement control unit 14d updates the correspondence relation table 13b so that the name of the line connected to the management target server to which the movement target virtual machine is moved is associated and registered with respect to the identifier of the back-up program executed by the movement target virtual machine.

The control unit 14 is a circuit such as the CPU.

Flow of Process

Figure 9A:
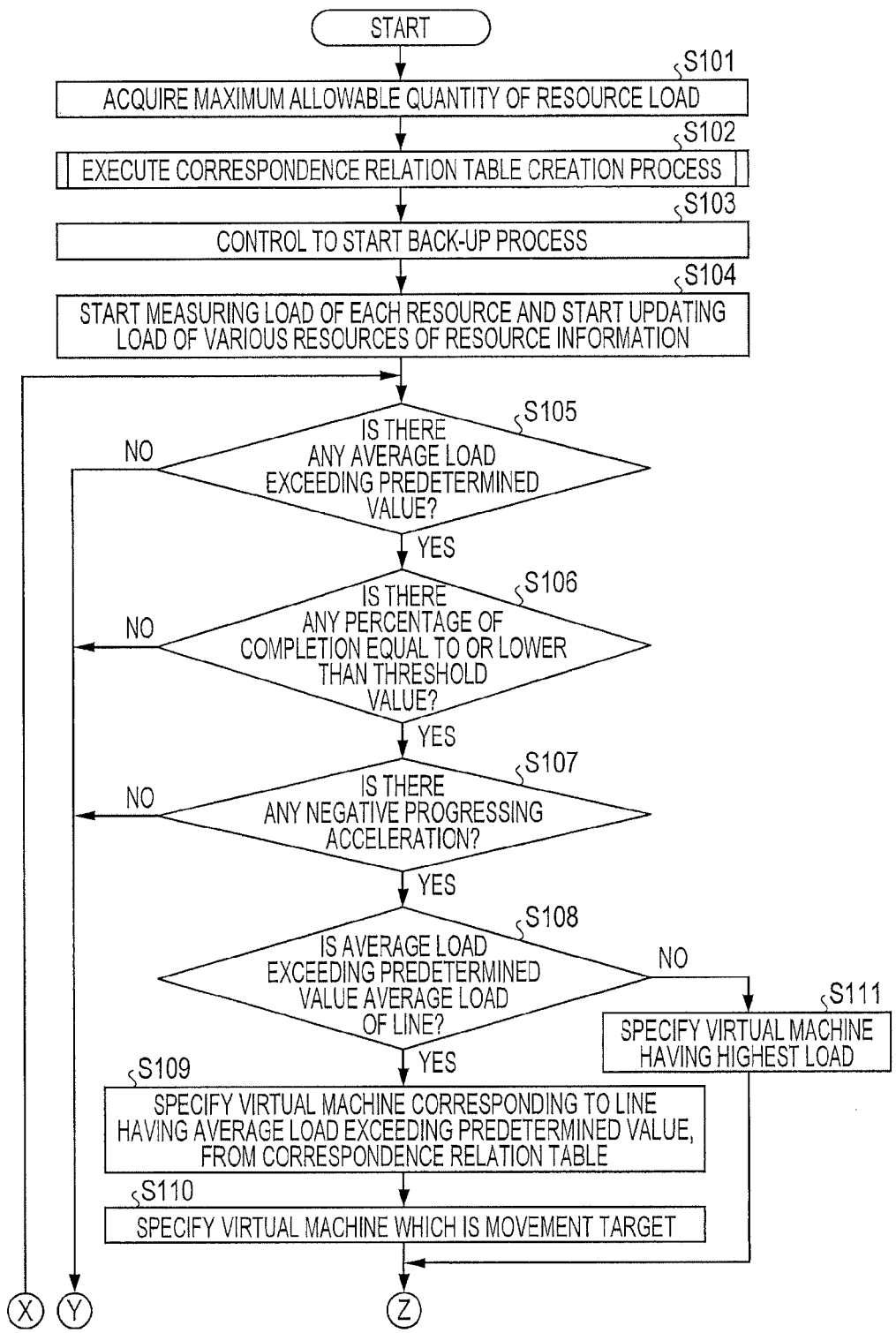
FIGS. 9A and 9B are flowcharts illustrating a procedure of a controlling process according to an example.
Figure 9B:
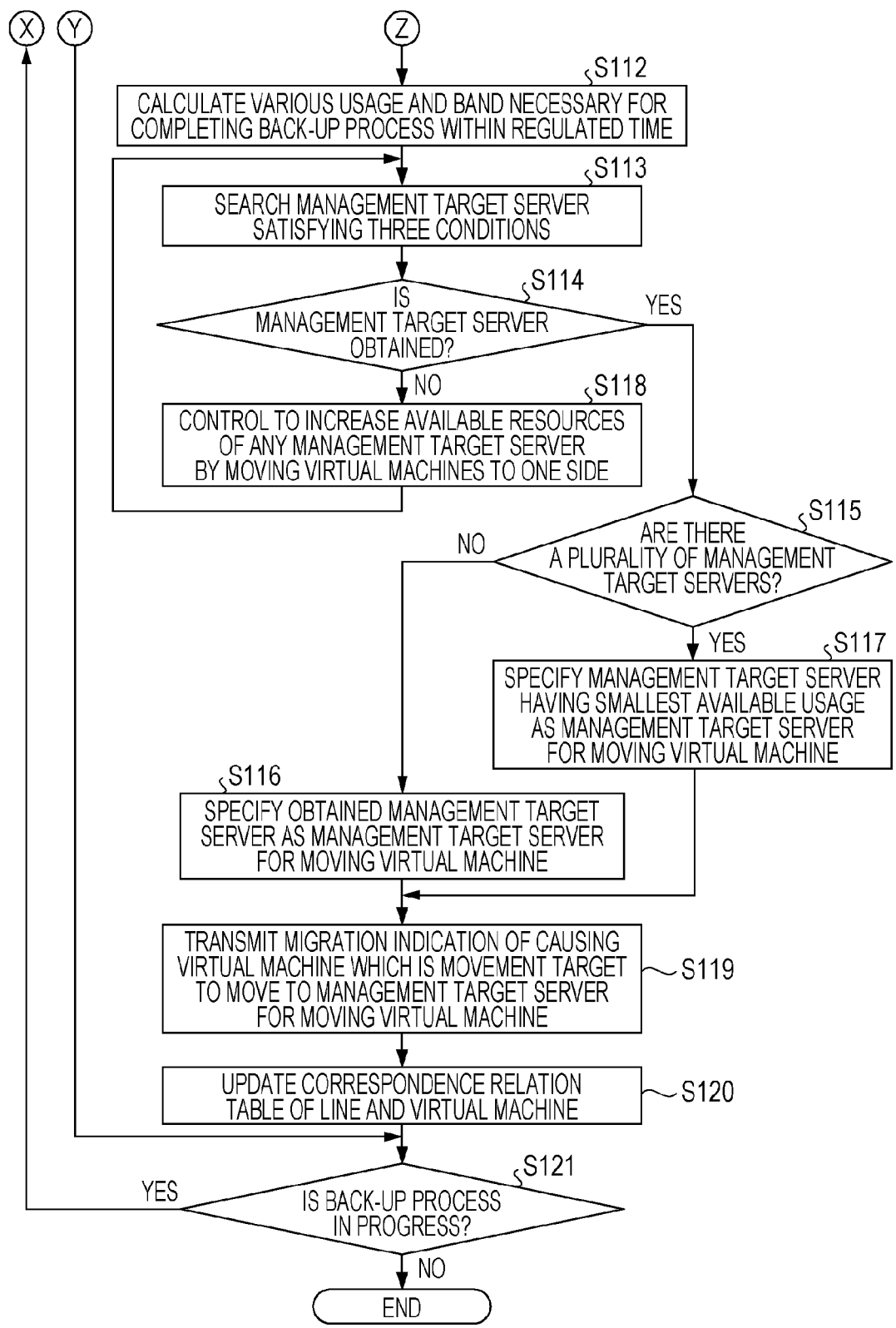

Next, a flow of the process executed by the management server 10 according to the example will be described. FIGS. 9A and 9B are flowcharts illustrating a procedure of a controlling process according to an example. The controlling process according to an example is executed when the acquisition unit 14a, for example, determines that the current time is in the time zone for performing the back-up process registered in the back-up information 13d, with reference to the back-up information 13d.

As illustrated in FIG. 9A, the acquisition unit 14a acquires the maximum allowable quantities of the loads of various resources (CPU, memory, and lines connected to each server) of each server of the back-up server 21 and the management target servers 22 to 24 from the allowable load quantity table 13a (S101).

Figure 10:
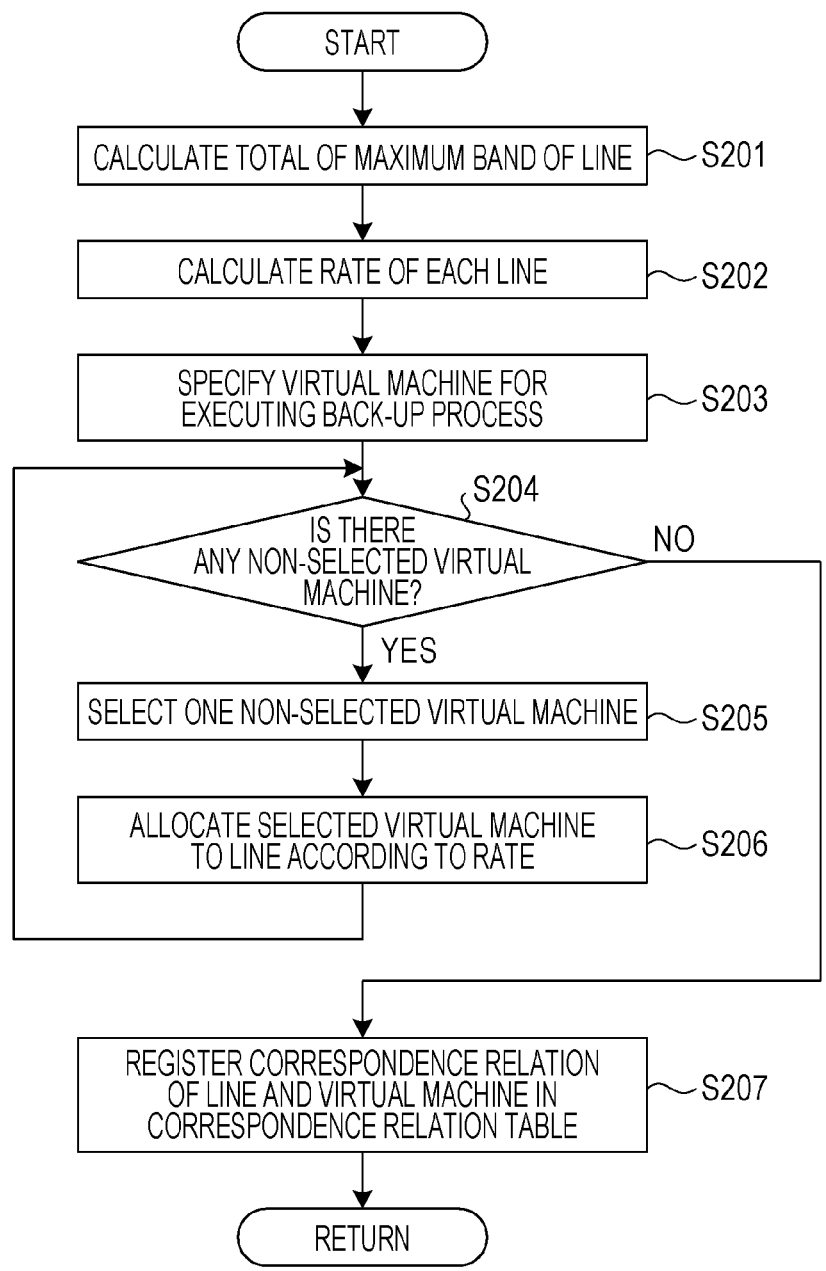
FIG. 10 is a flowchart illustrating a procedure of a correspondence relation table generation process according to an example.

Next, the acquisition unit 14a executes the correspondence relation table generation process (S102). The correspondence relation table generation process will be described. FIG. 10 is a flowchart illustrating a procedure of the correspondence relation table generation process according to the example. As illustrated in FIG. 10, the acquisition unit 14a calculates the total of maximum bands of the lines 28a and 28b connected to the back-up server 21 (S201).

The acquisition unit 14a calculates each rate of the bands of the lines 28a and 28b with respect to the calculated total of the bands (S202). The acquisition unit 14a specifies the virtual machine for executing the back-up process (S203).

The acquisition unit 14a determines whether or not there is an unselected virtual machine among the specified virtual machines (S204). When it is determined that there is the unselected virtual machine (S204; Yes), the acquisition unit 14a selects one unselected virtual machine (S205).

The acquisition unit 14a associates the selected virtual machine with the lines 28a and 28b according to the calculated rate (S206), and the process returns to S204.

Meanwhile, when it is determined that there is no unselected virtual machine (S204; No), the acquisition unit 14a registers the association of the associated virtual machine and the line in the correspondence relation table 13b (S207), and stores and returns the process results in the internal memory of the control unit 14.

By returning to the description of FIG. 9A, the acquisition unit 14a controls the virtual machine 21a to 21d to start the back-up process (S103). The acquisition unit 14a starts the measurement of the loads of various resources when the virtual machines 21a to 21d execute the back-up programs A to D, and starts the updating of the loads of various resources in the load information 13c (S104).

The first specifying unit 14b determines whether or not there is the average load exceeding a predetermined value (for example, 90%), among the average loads of the CPU of the virtual machines 21a to 21d registered in the load information 13c. The first specifying unit 14b determines whether or not there is an average load exceeding a predetermined value, for example, 90%, among the average loads of the memory of the virtual machines 21a to 21d registered in the load information 13c. In addition, the first specifying unit 14b calculates the total of the average load of the line 28a due to the virtual machine 21a and the average load of the line 28a due to the virtual machine 21c registered in the load information 13c, as an average load of the line 28a.

Further, the first specifying unit 14b calculates the total of the average load of the line 28b due to the virtual machine 21b and the average load of the line 28b due to the virtual machine 21d registered in the load information 13c, as an average load of the line 28b. Then, the first specifying unit 14b determines whether or not there is an average load exceeding a predetermined value, for example, 90%, among the average load of the line 28a and the average load of the line 28b (S105). When it is determined that there is no average load exceeding a predetermined value (for example, 90%) (S105; No), the first specifying unit 14b causes the process to proceed to S121 which will be described later.

Meanwhile, when it is determined that there is an average load exceeding a predetermined value (for example, 90%) (S105; Yes), the first specifying unit 14b performs the following process. That is, the first specifying unit 14b specifies the virtual machines having the average load exceeding the predetermined value among the virtual machines 21a to 21d, and determines whether or not there is a percentage of completion equal to or smaller than a threshold value among the percentages of completion of the back-up process of the specified virtual machines (S106). When there is no percentage of completion equal to or smaller than a threshold value among the percentages of completion of the back-up process of the specified virtual machines (S106; No), the first specifying unit 14b causes the process to proceed to S121 which will be described later.

Meanwhile, when there is a percentage of completion equal to or smaller than a threshold value among the percentages of completion of the back-up process of the specified virtual machines (S106; Yes), the first specifying unit 14b performs the following process. That is, the first specifying unit 14b determines whether or not there is negative progressing acceleration among progressing acceleration (%/s*s) of the back-up process with the percentage of completion which is equal to or smaller than the threshold value (S107). When it is determined that there is no negative progressing acceleration (S107; No), the first specifying unit 14b causes the process to proceed to S121 which will be described later.

Meanwhile, when it is determined that there is negative progressing acceleration (S107; Yes), the first specifying unit 14b performs the following process. That is, the first specifying unit 14b determines whether or not the average load exceeding the predetermined value (for example, 90%) is the average load of the line 28a or the average load of the line 28b (S108).

When it is determined that the average load exceeding the predetermined value (for example, 90%) is the average load of the line 28a or the average load of the line 28b (S108; Yes), the first specifying unit 14b performs the following process. That is, the first specifying unit 14b specifies the virtual machine corresponding to the line having the average load exceeding the predetermined value from the correspondence relation table 13b (S109).

When there is one specified virtual machine, the first specifying unit 14b specifies the specified virtual machine as a movement target virtual machine. When there is the plurality of specified virtual machines, the first specifying unit 14b specifies a virtual machine having the highest average load with respect to the line with the average load exceeding the predetermined value as the movement target virtual machine, from the plurality of specified virtual machines, with reference to the load information 13c (S110).

Meanwhile, when it is determined that the average load exceeding the predetermined value (for example, 90%) is not the average load of the line 28a and the average load of the line 28b (S108; No), the first specifying unit 14b performs the following process. That is, the first specifying unit 14b specifies the virtual machine having the average load exceeding the predetermined value as the movement target virtual machine (S111).

The second specifying unit 14c calculates the usage (GHz) of the CPU of the management target server at the movement destination desired for completing the back-up process of the movement target virtual machine within the regulated time. The second specifying unit 14c calculates the usage (GB) of the memory of the management target server at the movement destination desired for completing the back-up process of the movement target virtual machine within the regulated time. The second specifying unit 14c calculates the band (Gbps) of the line connected to the management target server at the movement destination desired for completing the back-up process of the movement target virtual machine within the regulated time (S112).

The second specifying unit 14c searches the management target server which satisfies the three conditions described above from the management target servers 22 to 24 (S113). The second specifying unit 14c determines whether or not there is the management target server satisfying the three conditions as a result of the searching (S114). When it is determined that there is a management target server satisfying the three conditions (S114; Yes), the second specifying unit 14c determines whether or not there are the plurality of obtained management target servers (S115). When there is one management target server (S115; No), the second specifying unit 14c specifies the obtained management target server as the management target server for moving the movement target virtual machine (S116) and causes the process to proceed to S119 which will be described later.

Meanwhile, when it is determined that there are the plurality of obtained management target servers (S115; Yes), the second specifying unit 14c performs the following process. That is, the second specifying unit 14c specifies the management target server having the smallest available usage of the CPU and the available usage of the memory from the plurality of obtained management target servers, as the management target server for moving the movement target virtual machine (S117) and causes the process to proceed to S119 which will be described later.

When it is determined that there is no management target server satisfying the three conditions as a result of the searching (S114; No), the second specifying unit 14c performs the following process. That is, the second specifying unit 14c moves the virtual machines 22a, 22b, 23a, and 24a to the specified management target server, and controls so that the available resource of any management target server from the management target servers 22 to 24 becomes greater (S118), and the process returns to S113.

The movement control unit 14d transmits a migration instruction of moving the movement target virtual machine specified by the first specifying unit 14b to the management target server specified by the second specifying unit 14c, to the VM host 21e (S119). The movement control unit 14d performs the following process, so that the name of the line connected to the management target server to which the movement target virtual machine is moved is associated and registered with respect to the identifier of the back-up program executed by the movement target virtual machine. That is, the movement control unit 14d updates the correspondence relation table 13b (S120).

The movement control unit 14d determines whether or not the back-up process is in progress (S121). When it is determined that the back-up process is in progress (S121; Yes), the movement control unit 14d causes the process to return to S105. Meanwhile, when it is determined that the back-up process is not in progress (S121; No), the movement control unit 14d causes the controlling process to end.

As described above, the management server 10 according to the example acquires the band loads of the lines 28a and 28b, the resource usages of the plurality of management target servers 22 to 24, the degree of completion of the back-up process executed by the virtual machines 21a to 21d. When an increase of at least one used band of lines 28a and 28b is detected and delay of the back-up process using the line with the detected increase of the used band is detected based on the degree of completion, the management server 10 performs the following process. That is, the management server 10 moves any one of the virtual machines 21a to 21d for performing the back-up process by using the line with the detected increase of the used band, to any of the plurality of management target servers 22 to 24 from the back-up server 21. The management target server at the movement destination of the movement target virtual machine is determined with the condition that no delay of the back-up process executed by the virtual machine to be moved, when the movement target virtual machine is moved, is expected based on the degree of completion. Therefore, according to the management server 10, when the route is a factor of the delay of the back-up process, it is possible to suppress the delay of the back-up process.

The management server 10 specifies the management target server having the smallest available resource among the management target servers satisfying the conditions described above, as the management target server at the movement destination of the movement target virtual machine. Accordingly, it is possible to suppress a decrease in the performance of the process of the virtual machine executed on the management target server, due to the movement of the virtual machine which executes the back-up process.

When it is determined that the back-up process tends to be delayed, based on the progressing acceleration based on the percentages of completion indicating a degree of completion of the back-up process using the line with the detected increase of the used band, the management server 10 performs the following process. That is, the management server 10 specifies the virtual machine in which the back-up process tends to be delayed based on the degree of completion of the back-up process, as the movement target virtual machine, among the virtual machines 21a to 21d, based on the registered content of the correspondence relation table 13b. Accordingly, the management server 10 may specify the movement target virtual machine by detecting the progressing acceleration which is an index for detecting the delay tendency based on the degree of completion of the back-up process, and therefore the management server 10 may specify the movement target virtual machine by detecting the delay tendency.

Hereinabove, the examples regarding the system and the apparatus of the embodiment have been described, but the embodiment may be realized with various other examples, other than the examples described above.

For example, the back-up server 21 and the plurality of management target servers 22 to 24 may be connected to the plurality of redundant lines, and the virtual machines operating on the management target servers may transmit the data in system area to the back-up server 21. In this case, the virtual machine for performing the back-up process operating on the back-up server 21 may perform the back-up process with the same method as described above, by using the data in the system area transmitted from the virtual machines operating on the management target servers.

Among the processes described in the examples, all or a part of the processes described to be automatically performed may be manually performed. Among the processes described in the examples, all or a part of the processes described to be manually performed may be automatically performed with the well-known method.

The processes in the steps of the processes described in the examples may be arbitrarily divided into several processes or may be combined with each other, according to various loads or state of use. In addition, the steps may be omitted.

The order of the processes in the steps of the processes described in the examples may be changed according to various loads or state of use.

The constituent elements of the devices illustrated in the drawings are conceptual in functions, and the configurations illustrated in the drawings are not physically desired. That is, the detailed state of the dispersion and integration of the devices is not limited to the drawings, and all or a part of the devices may be configured to be functionally or physically dispersed and integrated in an arbitrary unit, according to various loads or state of use.

Controlling Process

Figure 11:
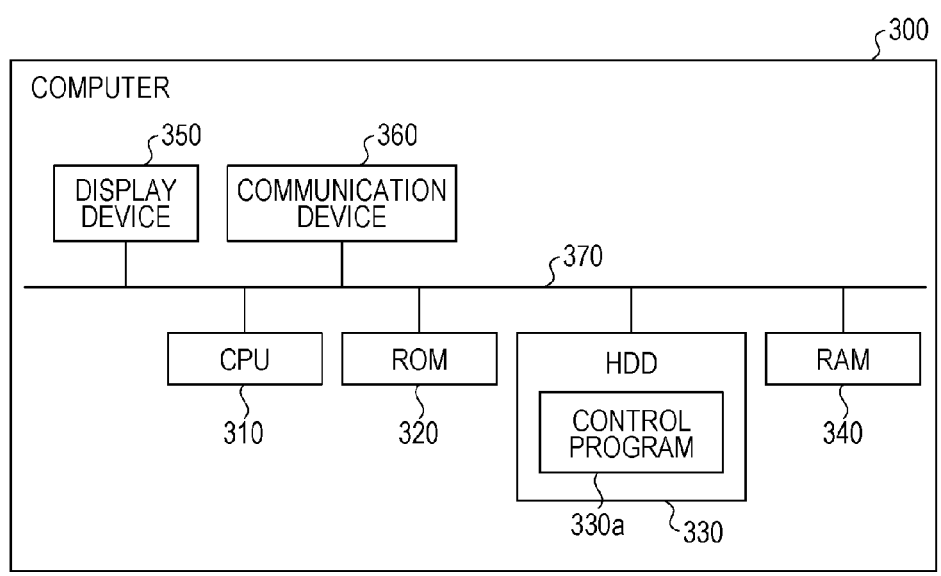
FIG. 11 is a diagram illustrating an example of a hardware configuration of a computer which executes a controlling program.

Various processes of the management server 10 described in the examples described above may be realized by executing the program prepared in advance by a computer system such as a personal computer or a work station. Hereinafter, an example of a computer which executes the controlling program, including the same function as that of the management server 10 described in the examples described above will be described, with reference to FIG. 11. FIG. 11 is a diagram illustrating a computer which executes the controlling program.

As illustrated in FIG. 11, a computer 300 includes a CPU 310, a ROM 320, an HDD 330, a RAM 340, a display device 350, and a communication device 360. The devices 310 to 360 are connected to each other through a bus 370.

The display device 350 is, for example, a liquid crystal display. The display device 350 corresponds to the display unit 11. The communication device 360 is a network card or the like. The communication device 360 corresponds to the communication unit 12.

A basic program such as an operating system (OS) is stored in the ROM 320. A controlling program 330a which exhibits the same function as that of the acquisition unit 14a, the first specifying unit 14b, the second specifying unit 14c, and the movement control unit 14d illustrated in the examples described above is stored in advance in the HDD 330. The HDD 330 includes various data items stored in the memory unit 13.

The CPU 310 reads out the controlling program 330a from the HDD 330 and executes the controlling program.

The CPU 310 reads out the various data items from the HDD 330 and stores the data items in the RAM 340. The CPU 310 further executes the controlling program 330a by using the various data items stored in the RAM 340. Regarding the data items stored in the RAM 340, all of the data items may not be stored in the RAM 340. The data items to be used in the process may be stored in the RAM 340.

The controlling program 330a described above may not be stored in the HDD 330 from the initial stage.

For example, the program may be stored in a "portable physical medium" such as a flexible disk (FD), a CD-ROM, a DVD, a magnet-optical disk, or an IC card to be inserted into the computer 300. Then, the computer 300 may read out the program and execute the program from the medium described above.

In addition, the program may be stored in "another computer (or server)" connected to the computer 300 through a public line, the Internet, a LAN, or a WAN. Then, the computer 300 may read out the program and execute the program from the computer or the server.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A controlling method realized by a computer connected to a plurality of physical devices in which respective virtual machines are operated and a process device which is connected to the plurality of physical devices with a plurality of routes and in which a plurality of duplication process virtual machines for executing a duplication process of duplicating data used by the plurality of virtual machines to a memory device different from the plurality of the physical devices are operated, the method comprising:

acquiring loads of the plurality of routes and percentages of completion of the duplication process executed by the plurality of duplication process virtual machines;

when the route is selected based on a used band and incompletion of the duplication process using the selected route within a regulated time is detected based on the percentage of completion, moving any of the duplication process virtual machines for performing the duplication process using the selected route to any of the plurality of physical devices from the process device; and when incompletion of the duplication process using the selected route within a regulated time is detected based on the percentage of completion, specifying any duplication process virtual machines for performing the duplication process using the selected route, based on a correspondence relation between the plurality of routes and the duplication process virtual machines for performing the duplication process using the routes, wherein the physical device at a movement destination is determined with the condition that completion of the duplication process executed by the duplication process virtual machine to be moved, when the duplication process virtual machine as a movement target is moved, is expected based on the percentage of completion.

2. The method according to claim 1, wherein the physical device at the movement destination is a physical device in which available resources included by the physical device at the movement destination are smallest among the plurality of physical devices satisfying the condition.

3. The method according to claim 1,
wherein the process of moving any duplication process virtual machine for performing the duplication process using the selected route to any of the plurality of physical devices from the process device includes:
when the specified duplication process virtual machine is moved from the plurality of the physical devices, specifying the physical device satisfying the condition that the duplication process executed by the moved duplication process virtual machine is completed within a regulated time, based on the percentage of completion; and moving the specified duplication process virtual machine to the specified physical device from the process device.

4. The method according to claim 3, wherein, in the process of specifying any of the duplication process virtual machines, when incompletion of the duplication process using the selected route within a regulated time is detected based on the percentage of completion and it is detected that a rate of change in the percentage of completion of the duplication process using the selected route is a negative value, the duplication process virtual machine having a negative value of the rate of change in the percentage of completion of the duplication process is specified based on the correspondence relation.

5. A non-transitory computer-readable storage medium storing a controlling program causing a computer connected to a plurality of physical devices in which respective virtual machines are operated and a process device which is connected to the plurality of physical devices with a plurality of routes and in which a plurality of duplication process virtual machines for executing a duplication process of duplicating data used by the plurality of virtual machines to a memory device different from the plurality of the physical devices are operated, to execute:

acquiring loads of the plurality of routes and percentages of completion of the duplication process executed by the plurality of duplication process virtual machines;

when the route is selected based on a used band and incompletion of the duplication process using the selected route within a regulated time is detected based on the percentage of completion, moving any of the duplication process virtual machines for performing the duplication process using the selected route to any of the plurality of physical devices from the process device; and when incompletion of the duplication process using the selected route within a regulated time is detected based on the percentage of completion, specifying any duplication process virtual machines for performing the duplication process using the selected route, based on a correspondence relation between the plurality of routes and the duplication process virtual machines for performing the duplication process using the routes, wherein the physical device at a movement destination is determined with the condition that completion of the duplication process executed by the duplication process virtual machine to be moved, when the duplication process virtual machine as a movement target is moved, is expected based on the percentage of completion.

6. The storage medium according to claim 5, wherein the physical device at the movement destination is a physical device in which available resources included by the physical device at the movement destination are smallest among the plurality of physical devices satisfying the condition.

7. The storage medium according to claim 5, wherein the process of moving any duplication process virtual machine for performing the duplication process using the selected route to any of the plurality of physical devices from the process device includes:

when the specified duplication process virtual machine is moved from the plurality of the physical devices, specifying the physical device satisfying the condition that the duplication process executed by the moved duplication process virtual machine is completed within a regulated time, based on the percentage of completion; and moving the specified duplication process virtual machine to the specified physical device from the process device.

8. The storage medium according to claim 7, wherein, in the process of specifying any of the duplication process virtual machines, when incompletion of the duplication process using the selected route within a regulated time is detected based on the percentage of completion and it is detected that a rate of change in the percentage of completion of the duplication process using the selected route is a negative value, the duplication process virtual machine having a negative value of the rate of change in the percentage of completion of the duplication process is specified based on the correspondence relation.

9. A controlling apparatus which is connected to a plurality of physical devices in which respective virtual machines are operated and a process device which is connected to the plurality of physical devices with a plurality of routes and in which a plurality of duplication process virtual machines for executing a duplication process of duplicating data used by the plurality of virtual machines to a memory device different from the plurality of the physical devices are operated, the apparatus comprising:

a memory; and a processor coupled to the memory and configured to:

acquire loads of the plurality of routes and percentages of completion of the duplication process executed by the plurality of duplication process virtual machines;

move any of the duplication process virtual machines for performing the duplication process using the selected route to any of the plurality of physical devices from the process device, when the route is selected based on a used band and incompletion of the duplication process using the selected route within a regulated time is detected based on the percentage of completion; and when incompletion of the duplication process using the selected route within a regulated time is detected based on the percentage of completion, specify any duplication process virtual machines for performing the duplication process using the selected route, based on a correspondence relation between the plurality of routes and the duplication process virtual machines for performing the duplication process using the routes, wherein the physical device at a movement destination is determined with the condition that completion of the duplication process executed by the duplication process virtual machine to be moved, when the duplication process virtual machine as a movement target is moved, is expected based on the percentage of completion.

10. The apparatus according to claim 9, wherein the physical device at the movement destination is a physical device in which available resources included by the physical device at the movement destination are smallest among the plurality of physical devices satisfying the condition.

11. The apparatus according to claim 9, wherein the process of moving any duplication process virtual machine for performing the duplication process using the selected route to any of the plurality of physical devices from the process device includes:

when the specified duplication process virtual machine is moved from the plurality of the physical devices, specifying the physical device satisfying the condition that the duplication process executed by the moved duplication process virtual machine is completed within a regulated time, based on the percentage of completion; and moving the specified duplication process virtual machine to the specified physical device from the process device.

12. The apparatus according to claim 11, wherein, in the process of specifying any of the duplication process virtual machines, when incompletion of the duplication process using the selected route within a regulated time is detected based on the percentage of completion and it is detected that a rate of change in the percentage of completion of the duplication process using the selected route is a negative value, the duplication process virtual machine having a negative value of the rate of change in the percentage of completion of the duplication process is specified based on the correspondence relation.

\* \* \* \* \*